(12) United States Patent
Seegmiller et al.

(10) Patent No.: US 11,754,408 B2
(45) Date of Patent: Sep. 12, 2023

(54) METHODS AND SYSTEMS FOR TOPOLOGICAL PLANNING IN AUTONOMOUS DRIVING

(71) Applicant: Argo AI, LLC, Pittsburgh, PA (US)

(72) Inventors: Neal Seegmiller, Pittsburgh, PA (US); Christopher Cunningham, Pittsburgh, PA (US); Ramadev Burigsay Hukkeri, Pittsburgh, PA (US); Thomas Petroff, Gibsonia, PA (US); Albert Costa, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 329 days.

(21) Appl. No.: 16/597,283

(22) Filed: Oct. 9, 2019

(65) Prior Publication Data

US 2021/0108936 A1    Apr. 15, 2021

(51) Int. Cl.
*G01C 21/26* (2006.01)
*B60W 30/18* (2012.01)
(Continued)

(52) U.S. Cl.
CPC ... *G01C 21/3461* (2013.01); *B60W 30/18163* (2013.01); *G05D 1/0088* (2013.01);
(Continued)

(58) Field of Classification Search
CPC ...... G01C 21/34; G01C 21/3461; G05D 1/00; G05D 1/02; G05D 1/0088; G05D 1/0212;
(Continued)

(56) References Cited

U.S. PATENT DOCUMENTS 6,393,362 B1 *  5/2002  Burns ................. G05D 1/0278
                                                340/940
8,219,298 B2 *  7/2012  Nishira ................ B60W 40/04
                                                701/96
(Continued)

FOREIGN PATENT DOCUMENTS

EP    3517893 A1      7/2019
GB    2598408 A   *   3/2022   .......... B60W 30/095
(Continued)

OTHER PUBLICATIONS

R. Laxhammarand G. Falkman, "Online Learning and Sequential Anomaly Detection in Trajectories," in IEEE Transactions on Pattern Analysis and Machine Intelligence, vol. 36, No. 6, pp. 1158-1173, Jun. 2014, doi: 10.1109/TPAMI.2013.172. (Year: 2014).*

(Continued)

*Primary Examiner* — Cuong H Nguyen
(74) *Attorney, Agent, or Firm* — FOX ROTHSCHILD LLP

(57) ABSTRACT

Systems and methods of maneuvering an autonomous vehicle in a local region using topological planning, while traversing a route to a destination location, are disclosed. The system includes an autonomous vehicle including one or more sensors and a processor. The processor is configured to determine the local region on the route and receive real-time information corresponding to the local region. The processor performs topological planning to identify on or more topologically distinct classes of trajectories, compute a constraint set for each of the one or more topologically distinct classes of trajectories, optimize a trajectory to generate a candidate trajectory for each constraint set, and select a trajectory for the autonomous vehicle to traverse the local region from amongst the one or more candidate trajectories. Each of the one or more topologically distinct classes is (Continued)

associated with a plurality of trajectories that take the same combination of discrete actions with respect to objects in the local region.

20 Claims, 14 Drawing Sheets

(51) Int. Cl.
    *G01C 21/34*     (2006.01)
    *G05D 1/00*     (2006.01)
    *G05D 1/02*     (2020.01)

(52) U.S. Cl.
    CPC ....... *G05D 1/0212* (2013.01); *B60W 2554/00* (2020.02); *B60W 2555/60* (2020.02); *G05D 2201/0213* (2013.01)

(58) Field of Classification Search
    CPC ........ G05D 2201/021; B60W 2554/00; B60W 30/18163; B60W 2555/60
    USPC .......................................................... 701/25
    See application file for complete search history.

(56) References Cited

U.S. PATENT DOCUMENTS

| | | | |
|---|---|---|---|
| 8,392,117 B2* | 3/2013 | Dolgov | G05D 1/0274 701/533 |
| 8,626,565 B2* | 1/2014 | Petroff | G05D 1/0088 705/7.35 |
| 8,660,720 B2* | 2/2014 | LaPorte | G05D 1/0661 701/15 |
| 9,475,491 B1* | 10/2016 | Nagasaka | B60W 30/18163 |
| 9,494,439 B1* | 11/2016 | Ross | G05D 1/0022 |
| 9,547,309 B2* | 1/2017 | Ross | G06Q 50/30 |
| 9,645,577 B1* | 5/2017 | Frazzoli | B60W 30/0956 |
| 9,734,455 B2* | 8/2017 | Levinson | G06K 9/00805 |
| 9,868,443 B2* | 1/2018 | Zeng | B60W 30/16 |
| 10,042,362 B2* | 8/2018 | Fairfield | G01C 21/3667 |
| 10,108,195 B2* | 10/2018 | Silvlin | G08G 1/167 |
| 10,137,896 B2* | 11/2018 | Zhuang | G01C 21/3453 |
| 10,139,828 B2* | 11/2018 | Ho | B60W 30/00 |
| 10,183,668 B2* | 1/2019 | Takae | B62D 15/0255 |
| 10,242,665 B1* | 3/2019 | Abeloe | G05D 1/0221 |
| 10,248,124 B2* | 4/2019 | Bellaiche | G06T 7/74 |
| 10,254,760 B1* | 4/2019 | Abeloe | G06N 3/0454 |
| 10,306,430 B1* | 5/2019 | Abari | G05D 1/0055 |
| 10,338,591 B2* | 7/2019 | Baalke | G05D 1/0244 |
| 10,338,594 B2* | 7/2019 | Long | G06K 9/00798 |
| 10,345,809 B2* | 7/2019 | Ross | G05D 1/0061 |
| 10,363,960 B2* | 7/2019 | Stefan | G05D 1/0088 |
| 10,379,533 B2* | 8/2019 | Bier | G01C 21/3492 |
| 10,452,070 B2* | 10/2019 | Greenfield | G05D 1/0212 |
| 10,488,868 B2* | 11/2019 | Averhart | G05D 1/0274 |
| 10,545,029 B2* | 1/2020 | Yang | G01C 21/32 |
| 10,606,269 B2* | 3/2020 | Millard | G05D 1/0274 |
| 10,620,631 B1* | 4/2020 | Abeloe | G05D 1/0088 |
| 10,620,638 B2* | 4/2020 | Budihal | G06K 9/6202 |
| 10,671,076 B1* | 6/2020 | Kobilarov | B60W 40/00 |
| 10,678,248 B2* | 6/2020 | Ford | B60W 30/16 |
| 10,725,473 B2* | 7/2020 | Nix | G06Q 10/047 |
| 10,795,364 B1* | 10/2020 | Abeloe | G06N 20/00 |
| 10,802,488 B1* | 10/2020 | Abeloe | G06N 3/0454 |
| 10,802,489 B1* | 10/2020 | Abeloe | G10L 15/16 |
| 10,836,405 B2* | 11/2020 | Wray | B60W 30/18163 |
| 10,883,844 B2* | 1/2021 | Ogale | G06N 3/08 |
| 10,937,178 B1* | 3/2021 | Srinivasan | G06T 7/521 |
| 11,004,000 B1* | 5/2021 | Gutmann | G06N 20/00 |
| 11,181,926 B2* | 11/2021 | Shalev-Shwartz | G01C 21/3492 |
| 11,249,479 B2* | 2/2022 | Thakur | G07C 5/08 |
| 11,256,983 B2* | 2/2022 | Ogale | G01S 17/931 |
| 11,403,853 B2* | 8/2022 | Murveit | G05D 1/0231 |
| 2002/0143461 A1* | 10/2002 | Burns | G08G 1/207 701/117 |
| 2008/0172148 A1* | 7/2008 | Isorce | G05D 1/0646 701/9 |
| 2009/0327011 A1* | 12/2009 | Petroff | G01C 21/343 705/5 |
| 2012/0130582 A1* | 5/2012 | Hukkeri | G05D 1/0289 701/25 |
| 2012/0209457 A1* | 8/2012 | Bushnell | G08G 5/0078 701/13 |
| 2013/0006473 A1* | 1/2013 | Buerkle | B60W 30/18145 701/41 |
| 2013/0085661 A1* | 4/2013 | Chan | G08G 5/0082 701/122 |
| 2013/0231855 A1* | 9/2013 | Mcaree | E02F 9/24 701/301 |
| 2014/0012436 A1* | 1/2014 | Coulmeau | G05D 1/0607 701/3 |
| 2014/0129073 A1* | 5/2014 | Ferguson | G05D 1/00 701/23 |
| 2015/0105946 A1* | 4/2015 | Kumar | B64C 39/024 701/3 |
| 2015/0134204 A1* | 5/2015 | Kunihiro | B60W 40/112 701/41 |
| 2015/0344030 A1* | 12/2015 | Damerow | B60W 30/0956 701/1 |
| 2016/0334229 A1* | 11/2016 | Ross | G08G 1/161 |
| 2016/0334230 A1* | 11/2016 | Ross | G01C 21/3415 |
| 2016/0334797 A1* | 11/2016 | Ross | G06Q 10/08 |
| 2017/0090480 A1* | 3/2017 | Ho | G05D 1/0027 |
| 2017/0123419 A1* | 5/2017 | Levinson | G01S 7/4972 |
| 2017/0124476 A1* | 5/2017 | Levinson | G01S 17/86 |
| 2017/0129486 A1* | 5/2017 | Nakada | B60W 10/20 |
| 2017/0183004 A1* | 6/2017 | Bonarens | B60W 30/09 |
| 2017/0192437 A1* | 7/2017 | Bier | G05D 1/0016 |
| 2017/0242435 A1* | 8/2017 | Nilsson | G08G 1/167 |
| 2017/0277195 A1* | 9/2017 | Frazzoli | G05D 1/0088 |
| 2017/0316333 A1* | 11/2017 | Levinson | G06K 9/00805 |
| 2017/0323249 A1* | 11/2017 | Khasis | G01C 21/3469 |
| 2017/0365178 A1* | 12/2017 | Shay | G08G 5/0039 |
| 2018/0017971 A1* | 1/2018 | Di Cairano | B60W 30/02 |
| 2018/0024562 A1* | 1/2018 | Bellaiche | G06T 7/73 701/26 |
| 2018/0075309 A1* | 3/2018 | Sathyanarayana | H04N 5/247 |
| 2018/0099676 A1* | 4/2018 | Goto | G01C 21/3492 |
| 2018/0143643 A1* | 5/2018 | Fairfield | G01C 21/20 |
| 2018/0189578 A1* | 7/2018 | Yang | G06K 9/4638 |
| 2018/0215386 A1* | 8/2018 | Naserian | G08G 1/096783 |
| 2018/0246517 A1* | 8/2018 | Costa | B60W 30/0953 |
| 2018/0259966 A1* | 9/2018 | Long | G05D 1/0246 |
| 2018/0315314 A1* | 11/2018 | Gilsenan | G08G 1/096844 |
| 2018/0329418 A1* | 11/2018 | Baalke | G08G 1/166 |
| 2018/0329428 A1* | 11/2018 | Nagy | G05D 1/0088 |
| 2018/0348767 A1* | 12/2018 | Jafari Tafti | G08G 1/163 |
| 2018/0356819 A1* | 12/2018 | Mahabadi | B60W 30/08 |
| 2019/0033085 A1* | 1/2019 | Ogale | G06N 3/0454 |
| 2019/0034794 A1* | 1/2019 | Ogale | G05D 1/0212 |
| 2019/0056748 A1* | 2/2019 | Budihal | G05D 1/0088 |
| 2019/0071092 A1* | 3/2019 | Ma | B60W 10/06 |
| 2019/0072964 A1* | 3/2019 | Nix | G06Q 10/0631 |
| 2019/0086924 A1* | 3/2019 | Greenfield | B60W 60/0011 |
| 2019/0092570 A1* | 3/2019 | MacDonald | G06N 7/00 |
| 2019/0118939 A1* | 4/2019 | Cantinaud | G08G 5/065 |
| 2019/0122572 A1* | 4/2019 | Morellec | G08G 5/0021 |
| 2019/0135283 A1* | 5/2019 | Bonk | G08G 1/0112 |
| 2019/0137287 A1* | 5/2019 | Pazhayampallil | H04W 4/40 |
| 2019/0179311 A1* | 6/2019 | Paden | G06T 7/20 |
| 2019/0196481 A1* | 6/2019 | Tay | G01S 17/86 |
| 2019/0216003 A1* | 7/2019 | Green | A01B 79/005 |
| 2019/0219401 A1* | 7/2019 | Daniilidis | G01C 21/18 |
| 2019/0236955 A1* | 8/2019 | Hu | G08G 1/096844 |
| 2019/0239416 A1* | 8/2019 | Green | A01B 69/007 |
| 2019/0243370 A1* | 8/2019 | Li | G05D 1/0214 |
| 2019/0243371 A1* | 8/2019 | Nister | G05D 1/0231 |
| 2019/0250617 A1* | 8/2019 | Ford | B60W 50/0097 |
| 2019/0278297 A1* | 9/2019 | Averhart | G05D 1/0278 |
| 2019/0283802 A1* | 9/2019 | Matsunaga | B62D 15/0265 |
| 2019/0286151 A1* | 9/2019 | Palanisamy | G01C 21/3461 |
| 2019/0317516 A1* | 10/2019 | Zhu | G05D 1/0223 |
| 2019/0339709 A1* | 11/2019 | Tay | G05D 1/0088 |

(56) References Cited

U.S. PATENT DOCUMENTS

| | | | |
|---|---|---|---|
| 2019/0346851 A1* | 11/2019 | Liu | B60W 60/00276 |
| 2019/0354106 A1* | 11/2019 | Gupta | G05D 1/0219 |
| 2019/0364403 A1* | 11/2019 | Abari | H04W 4/40 |
| 2019/0369637 A1* | 12/2019 | Shalev-Shwartz | G01C 21/3415 |
| 2020/0023842 A1* | 1/2020 | Gutierrez | G06K 9/00805 |
| 2020/0026276 A1* | 1/2020 | Zhang | G01C 21/3407 |
| 2020/0050195 A1* | 2/2020 | Gross | B60W 60/00272 |
| 2020/0064483 A1* | 2/2020 | Li | G01S 17/87 |
| 2020/0064851 A1* | 2/2020 | Wilkinson | G05D 1/0088 |
| 2020/0077861 A1* | 3/2020 | Kwak | G05D 1/0289 |
| 2020/0081454 A1* | 3/2020 | Kwak | A47L 11/4061 |
| 2020/0089241 A1* | 3/2020 | Kao | G01C 21/3492 |
| 2020/0110416 A1* | 4/2020 | Hong | G06N 20/00 |
| 2020/0110421 A1* | 4/2020 | Lin | G05D 1/0223 |
| 2020/0139967 A1* | 5/2020 | Beller | B60W 30/18159 |
| 2020/0148201 A1* | 5/2020 | King | B60W 30/0953 |
| 2020/0150672 A1* | 5/2020 | Naghshvar | G06K 9/00791 |
| 2020/0156632 A1* | 5/2020 | Ding | G05D 1/0088 |
| 2020/0174490 A1* | 6/2020 | Ogale | G05D 1/0221 |
| 2020/0180612 A1* | 6/2020 | Finelt | B60W 60/0027 |
| 2020/0189573 A1* | 6/2020 | King | B60W 60/0011 |
| 2020/0225669 A1* | 7/2020 | Silva | B60W 60/0015 |
| 2020/0232806 A1* | 7/2020 | Goldman | G01C 21/3658 |
| 2020/0233415 A1* | 7/2020 | Panzica | G05D 1/0212 |
| 2020/0239024 A1* | 7/2020 | Srinivasan | G05D 1/0011 |
| 2020/0240794 A1* | 7/2020 | Prasser | G01C 21/3446 |
| 2020/0247434 A1* | 8/2020 | Kim | G06K 9/00845 |
| 2020/0249674 A1* | 8/2020 | Dally | G06N 3/08 |
| 2020/0257301 A1* | 8/2020 | Weiser | G05D 1/0214 |
| 2020/0283014 A1* | 9/2020 | Wray | B60W 60/001 |
| 2020/0293044 A1* | 9/2020 | Millard | G01C 21/20 |
| 2020/0298891 A1* | 9/2020 | Liang | G05D 1/0221 |
| 2020/0312168 A1* | 10/2020 | Liu | B64D 37/26 |
| 2020/0331476 A1* | 10/2020 | Chen | B60W 30/0956 |
| 2020/0341474 A1* | 10/2020 | Zuo | G05D 1/0214 |
| 2020/0346666 A1* | 11/2020 | Wray | G05D 1/0221 |
| 2020/0353949 A1* | 11/2020 | Huang | B60W 60/001 |
| 2020/0363806 A1* | 11/2020 | Kobilarov | G05D 1/0088 |
| 2021/0048506 A1* | 2/2021 | Panaget | G01S 5/0284 |
| 2021/0078594 A1* | 3/2021 | Bansal | G01C 21/3815 |

FOREIGN PATENT DOCUMENTS

| | | | | |
|---|---|---|---|---|
| KR | 10-2019-0101925 A | 9/2019 | | |
| WO | 2018160486 A1 | 9/2018 | | |
| WO | WO-2018172849 A1 * | 9/2018 | | B60W 60/0011 |
| WO | WO-2019023628 A1 * | 1/2019 | | B60W 30/10 |
| WO | 2019104112 A1 | 5/2019 | | |
| WO | WO-2021003379 A1 * | 1/2021 | | B60W 60/00274 |

OTHER PUBLICATIONS

N. Deo, A. Rangesh and M. M. Trivedi, "How Would Surround Vehicles Move? A Unified Framework for Maneuver Classification and Motion Prediction," in IEEE Transactions on Intelligent Vehicles, vol. 3, No. 2, pp. 129-140, Jun. 2018, doi: 10.1109/TIV.2018. 2804159. (Year: 2018).*

N. Anjum and A. Cavallaro, "Multifeature Object Trajectory Clustering for Video Analysis," in IEEE Transactions on Circuits and Systems for Video Technology, vol. 18, No. 11, pp. 1555-1564, Nov. 2008, doi: 10.1109/TCSVT.2008.2005603 (Year: 2008).*

Deo, N., Rangesh, A. and Trivedi, M.M., 2018. How would surround vehicles move. A unified framework for maneuver classification and motion prediction. (Year: 2018).*

W. Wang, et al. "A Path Following Lateral Control Scheme for Four-Wheel Independent Drive Autonomous Vehicle Using Sliding Mode Prediction Control," in IEEE Trans on Transportation Electrification, vol. 8, No. 3, pp. 3192-3207, Sep. 2022, doi: 10.1109/ TTE.2022.3170059. (Year: 2022).*

W. Wang, T. Qie, C. Yang, W. Liu, C. Xiang and K. Huang, "An Intelligent Lane-Changing Behavior Prediction and Decision-Making Strategy for an Autonomous Vehicle," in IEEE Transactions on Industrial Electronics, vol. 69, No. 3, pp. 2927-2937, Mar. 2022, doi: 10.1109/TIE.2021.3066943.(Year: 2021).*

Y. Wang, Z. Liu, Z. Zuo, Z. Li, L. Wang and X. Luo, "Trajectory Planning and Safety Assessment of Autonomous Vehicles Based on Motion Prediction and Model Predictive Control," in IEEE Transactions on Vehicular Technology, vol. 68, No. 9, pp. 8546-8556, Sep. 2019, doi: 10.1109/TVT.2019.2930684.(Year: 2019).*

Gu, T. et al., "Automated Tactical Maneuver Discovery, Reasoning and Trajectory Planning for Autonomous Driving", (<https://www. ri.cmu.edu/wp-content/uploads/2016/10/20160801-IROS-Camera-Ready.pdf>).

International Search Report and Written Opinion dated Feb. 8, 2021, for Application No. PCT/US2020/054358.

* cited by examiner

METHODS AND SYSTEMS FOR TOPOLOGICAL PLANNING IN AUTONOMOUS DRIVING

BACKGROUND

Successful design and deployment of autonomous vehicles (AV) requires finding an optimal road/lane-level path from the AV's current location to a specified destination in a map including a road network. Routes typically require lane changes (for example, the AV must merge into a leftmost lane to make a left turn, perform lane changes to overtake a slower object, etc.) as well as in-lane maneuvers (for example, tracking behind an object, stopping before a stationary object, steering around a stationary object, etc.).

Prior art methods for AV trajectory planning typically involve generating a number of candidate trajectories, scoring them, and selecting the best one for execution. For performing lane changes, the number of possible candidate trajectories is typically infinitely high because of the number of variations of transition start/end locations, transition start/end times, steering/speed profiles, or the like. However, the number of candidate trajectories that can be evaluated and scored is limited by available computational resources, and to conserve computation resources, prior art methods typically consider only a few transitions based on heuristics (for example, start the lane change transition immediately, set the transition length and shape using a heuristic based on current AV speed). In certain driving conditions such as dense traffic, to successfully complete a lane change may require a complex maneuver, for example to speed up and steer abruptly into a narrow gap between vehicles in the destination lane that is currently several vehicles ahead. If an autonomous driving system only considers a finite number of lane change variations based on heuristics, it is unlikely to plan a successful lane change maneuver in these conditions.

Similarly, for in-lane maneuvers, prior art methods typically sample a finite number of candidate trajectories in parametrized space, either by discretization or random sampling. Because the number of sampled trajectories is finite, this approach may fail to find a feasible trajectory when one exists, or it may find a suboptimal trajectory This document describes methods and systems that are directed to addressing the problems described above, and/or other issues.

SUMMARY

In one or more scenarios, systems and methods of maneuvering an autonomous vehicle in a local region using topological planning, while traversing a route to a destination location, are disclosed. The system may include an autonomous vehicle comprising one or more sensors, a processor, and a non-transitory computer medium comprising programming instructions that cause the processor to execute the methods disclosed. The methods may include determining the local region on the route and receiving real-time information corresponding to the local region. The method may further include performing topological planning to identify on or more topologically distinct classes of trajectories, computing a constraint set for each of the one or more topologically distinct classes of trajectories, optimizing a trajectory to generate a candidate trajectory for each constraint set, and selecting a trajectory for the autonomous vehicle to traverse the local region from amongst the one or more candidate trajectories. Each of the one or more topologically distinct classes is associated with a plurality of trajectories that take the same combination of discrete actions with respect to objects in the local region. The local region may be a region around the autonomous vehicle that includes a first area in front of a current location of the autonomous vehicle and a second area behind the current location of the autonomous vehicle.

Optionally, the real-time information may include, for example and without limitation, perception information corresponding to the one or more objects in the local region, trajectory predictions relating to the one or more objects in the local region, information relating to an environment of the autonomous vehicle in the local region, and/or current state information of the autonomous vehicle.

In one or more embodiments, selecting the trajectory for the autonomous vehicle to traverse the local region may include assigning a score to each of the one or more candidate trajectories, selecting a candidate trajectory that has a best score as the trajectory for the autonomous vehicle to traverse the local region. Optionally, the score may be assigned to a candidate trajectory based on, for example, a risk of collision associated with that trajectory, or compliance of that trajectory with traffic rules, or a comfort level associated with that trajectory. Furthermore, scoring may include biasing for temporal consistency.

A constraint set may include one or more constraints associated with, for example, longitudinal autonomous vehicle actions associated with perceived static or dynamic objects in the local region, longitudinal autonomous vehicle actions associated with restricted map areas, lateral autonomous vehicle actions associated with perceived static or dynamic objects in the local region, and/or lateral autonomous vehicle actions associated with restricted map areas. In certain embodiments, the methods may also include discarding a constraint set of the one or more constraint sets corresponding to the one or more topologically distinct classes of trajectories if a constraint set is determined to be infeasible, redundant, and/or heuristically expensive.

In certain embodiments, performing topological planning to identify the set of constraints determining one or more constraints associated with longitudinal autonomous vehicle actions before determining one or more constraints associated with lateral autonomous vehicle actions (with respect to a moving object).

The methods may also include updating the optimized trajectory based on at least one of the following: real-time information corresponding to the local region; or predictions updated based on an intent of the autonomous vehicle.

Optionally, if the trajectory for the autonomous vehicle to traverse the local region includes a lane change trajectory, the methods may also include identifying a time interval for executing the lane change.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
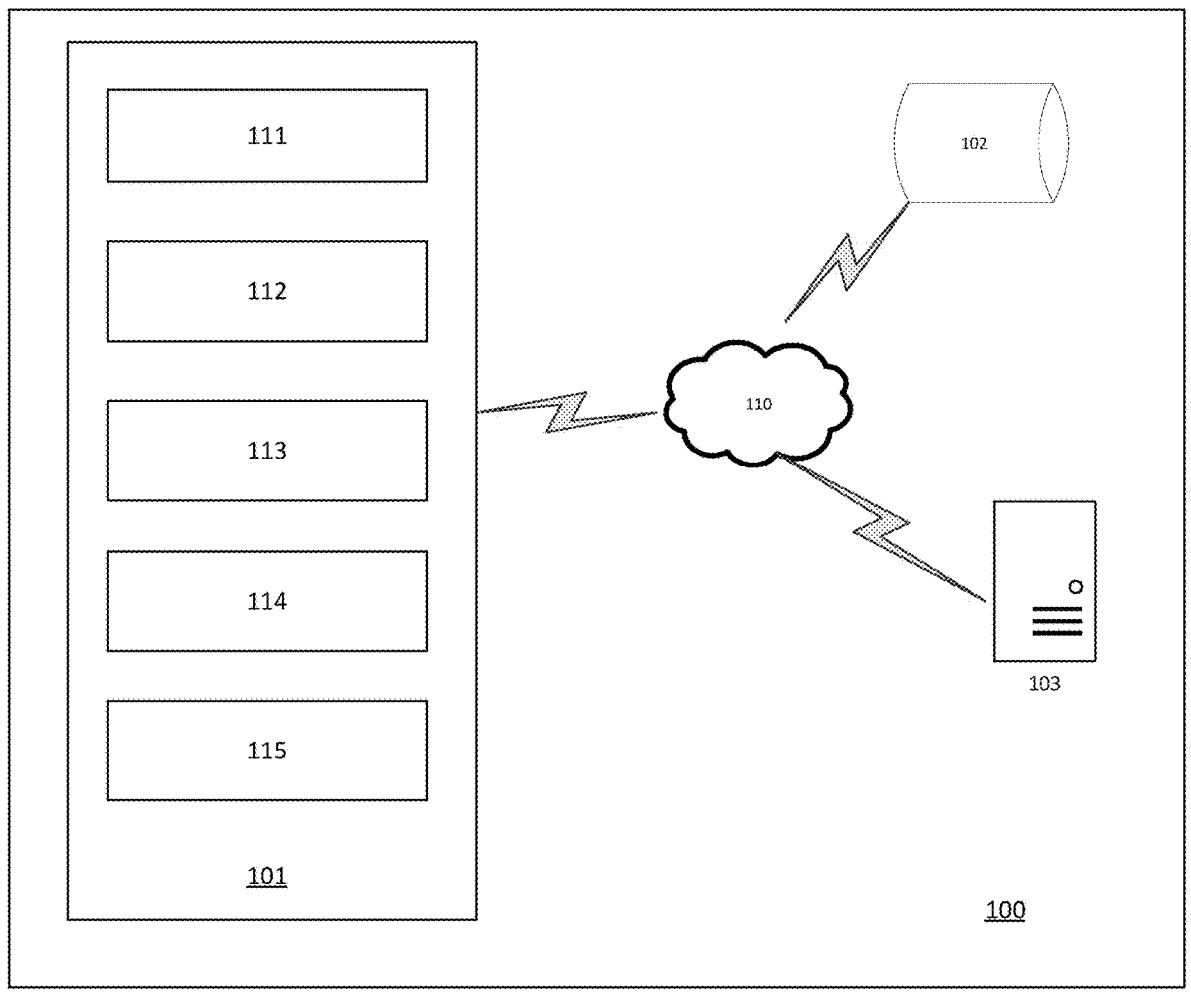
FIG. 1 illustrates an example system that includes an autonomous vehicle.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data stores, traffic information data stores, user information data stores, point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, a vehicle controller 112, a vehicle control system 113, a communications interface 114, and a user interface 115. Autonomous vehicle 101 may further include certain components (not shown here) included in vehicles, such as, an engine, wheels, steering wheel, transmission, etc., which may be controlled by vehicle control system 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a Light Detection and Ranging (LiDAR) system, a Radio Detection and Ranging (RADAR) system, one or more cameras (e.g., visible spectrum cameras, infrared cameras, etc.), temperature sensors, position sensors, location sensors (e.g., global positioning system (GPS), etc.), fuel sensors, speed sensors, odometer sensor, motion sensors (e.g., inertial measurement units (IMU), accelerometer, gyroscope, etc.), object detection sensors such as one or more cameras humidity sensors, environmental sensors (e.g., a precipitation sensor and/or ambient temperature sensor) occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like.

Figure 2:
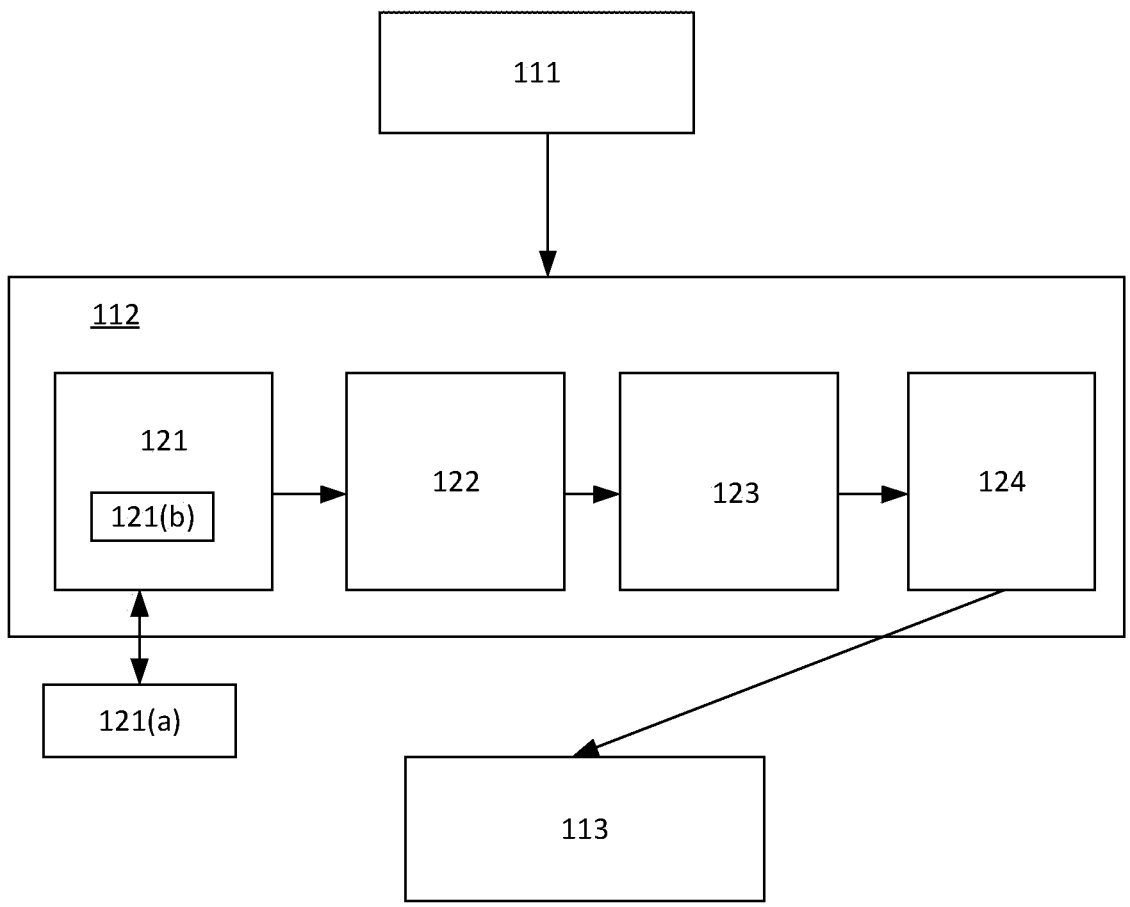
FIG. 2 illustrates block diagram of various components of an example controller of an autonomous vehicle.

As shown in FIG. 2, the vehicle controller 112 may receive data collected by the sensor system 111 and analyze it to provide one or more vehicle control instructions to the vehicle control system 113. The vehicle controller 112 may include, without limitation, a location subsystem 121, a perception subsystem 122, a prediction subsystem 123, and a motion planning subsystem 124.

The location subsystem 121 may include and/or may retrieve map data from a map data store 121(a) that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle controller 112 in analyzing the surrounding environment of the autonomous vehicle. In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the location subsystem 121 may also include and/or may receive information relating to the trip or route of a user, real-time traffic information on the route, or the like.

The location subsystem 121 may include and/or may be in communication with a routing module 121(b) that generates a navigation route from a start position to a destination position for an autonomous vehicle. The routing module 112(b) may access the map data store 112(a) to identify possible routes and road segments that a vehicle can travel on to get from the start position to the destination position. The routing module 112(b) may score the possible routes and identify a preferred route to reach the destination. For example, the routing module 112(b) may generate a navigation route that minimizes Euclidean distance traveled or other cost function during the route, and may further access the traffic information and/or estimates that can affect an amount of time it will take to travel on a particular route. Depending on implementation, the routing module 112(b) may generate one or more routes using various routing methods, such as Dijkstra's algorithm, Bellman-Ford algorithm, or other algorithms. The routing module 112(b) may also use the traffic information to generate a navigation route that reflects expected conditions of the route (e.g., current day of the week or current time of day, etc.), such that a route generated for travel during rush-hour may differ from a route generated for travel late at night. The routing module 112(b)

may also generate more than one navigation route to a destination and send more than one of these navigation routes to a user for selection by the user from among various possible routes.

Based on the sensor data provided by sensor system 111 and information obtained by the location subsystem 121, the perception subsystem 122 may determine perception information of the surrounding environment of the autonomous vehicle 101 during travel from the start position to the destination along the preferred route. The perception information may represent what an ordinary driver would perceive in the surrounding environment of a vehicle. The perception data may include information relating to one or more objects in the environment of the autonomous vehicle 101. For example, the perception subsystem 122 may process sensor data (e.g., LiDAR or RADAR data, camera images, etc.) in order to identify objects and/or features in the environment of autonomous vehicle. The objects may include traffic signals, roadway boundaries, other vehicles, pedestrians, and/or obstacles, etc. The perception subsystem 122 may use any now or hereafter known object recognition algorithms, video tracking algorithms, and computer vision algorithms (e.g., track objects frame-to-frame iteratively over a number of time periods) to determine the perception.

In some embodiments, the perception subsystem 122 may also determine, for one or more identified objects in the environment, the current state of the object. The state information may include, without limitation, for each object: current location; current speed and/or acceleration, current heading; current orientation; size/footprint; type (e.g., vehicle vs. pedestrian vs. bicycle vs. static object or obstacle); and/or other state information.

The prediction subsystem 123 may predict the future locations, trajectories, and/or actions of the objects based at least in part on perception information (e.g., the state data for each object) received from the perception subsystem 122, the location information received from the location subsystem 121, the sensor data, and/or any other data that describes the past and/or current state of the objects, the autonomous vehicle 101, the surrounding environment, and/or their relationship(s). For example, if an object is a vehicle and the current driving environment includes an intersection, prediction subsystem 123 may predict whether the object will likely move straight forward or make a turn. If the perception data indicates that the intersection has no traffic light, prediction subsystem 123 may also predict whether the vehicle may have to fully stop prior to enter the intersection. Such predictions may be made for a given time horizon (e.g., 5 seconds in the future). In certain embodiments, the prediction subsystem 123 may provide the predicted trajector(ies) for each object to the motion planning subsystem 124.

The motion planning subsystem 124 may determine a motion plan for the autonomous vehicle based on the perception data and/or the prediction data. Specifically, given predictions about the future locations of proximate objects and other perception data, the motion planning subsystem 124 can determine a motion plan for the autonomous vehicle 101 that best navigates the autonomous vehicle 101 relative to the objects at their future locations.

In one or more embodiments, the motion planning subsystem 124 may receive the predictions from the prediction 123 and make a decision regarding how to handle objects in the environment of the autonomous vehicle 101. For example, for a particular object (e.g., a vehicle with a given speed, direction, turning angle, etc.), motion planning subsystem 124 decides whether to overtake, yield, stop, and/or pass based on, for example, traffic conditions, map data, state of the autonomous vehicle, etc. In some embodiments, for a given object, the motion planning subsystem 124 may decide what to do with the object and may determine how to do it. For example, for a given object, the motion planning subsystem 124 may decide to pass the object, and then may determine whether to pass on the left side or right side of the object (including motion parameters such as speed, and lane change decisions). The motion planning subsystem 124 may also assess the risk of a collision between a detected object and the autonomous vehicle 101. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the controller 120 may transmit appropriate control instructions to the vehicle control system 113 for execution to perform a cautious maneuver (e.g., mildly slow down, accelerate, change lane, or swerve). In contrast, if the collision cannot be avoided, then the controller 120 may transmit appropriate control instructions to the vehicle control system 113 for execution of an emergency maneuver (e.g., brake and/or change direction of travel).

Furthermore, the motion planning subsystem 124 also plans a trajectory ("trajectory generation") for the autonomous vehicle 101 to travel on a given route (e.g., a nominal route generated by the routing module 112(*b*)). The trajectory specifies the spatial path for the autonomous vehicle as well as a velocity profile. The controller converts the trajectory into control instructions for the vehicle control system, including but not limited to throttle/brake and steering wheel angle commands. Trajectory generation may involve making decisions relating to lane changes, such as, without limitation, whether a lane change is required, where to perform a lane change, and when to perform a lane change. Specifically, one objective of the motion planning subsystem 124 is to generate a trajectory for motion of the vehicle from a start position to a destination on the nominal route, taking into account the perception and prediction data.

The motion planning subsystem 124 may generate the trajectory by performing topological planning to generate a set of constraints for each of a plurality of topologically distinct classes of trajectories, optimizing a single candidate trajectory for each class, and scoring the candidate trajectories to select an optimal trajectory. Topological classes are distinguished by the discrete actions taken with respect obstacles or restricted map areas. Specifically, all possible trajectories in a topologically distinct class takes the same action with respect to obstacles or restricted map areas. Obstacles may include, for example, static objects such as traffic cones and bollards, or other road users such as pedestrians, cyclists, and cars. Restricted map areas may include, for example, crosswalks and intersections. Discrete actions may include, for example, to stop before or proceed through, to track ahead or behind, or to pass on the left or right of something.

The motion planning subsystem may use the preferred route information provided by the routing module 112(*b*) in combination with perception data, prediction data to select the optimal trajectory, as discussed below.

As discussed above, planning and control data regarding the movement of the autonomous vehicle is generated by the motion planning subsystem 124 of the controller 120 that is transmitted to the vehicle control system 113 for execution. The vehicle control system 113 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making and or operational control may be handled in full or in part by other computing devices that are in electronic communication with the vehicle's on-board controller and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Figure 3:
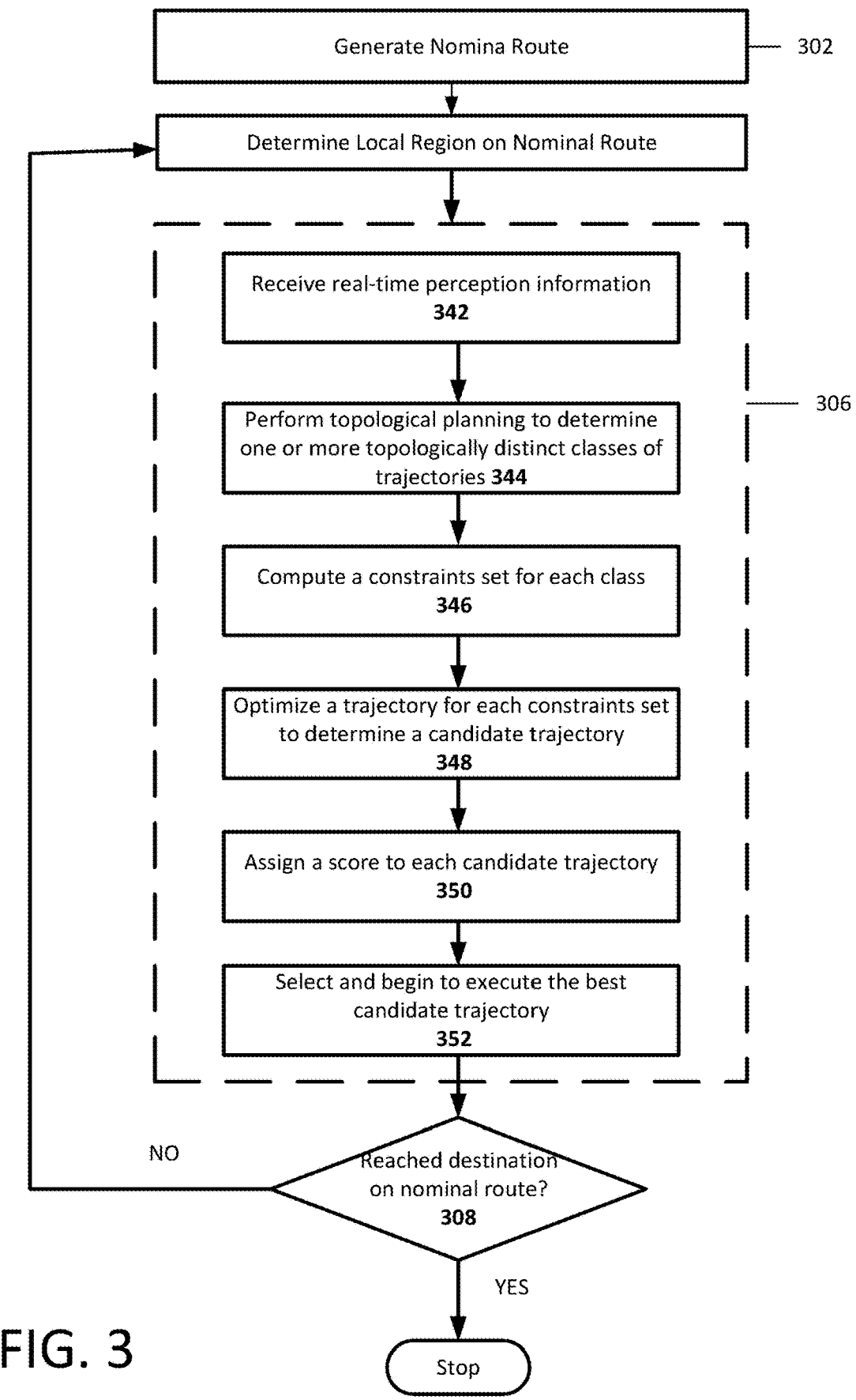
FIG. 3 illustrates a flowchart of an example method for trajectory generation using topological.

Referring now to FIG. 3, a flowchart illustrating an example method for trajectory generation using topological planning is shown.

At 302, the system may generate a nominal route from a starting point to a destination through a road network on which an autonomous vehicle may travel. In some embodiments, a nominal route may represent a unique or distinct route through the road network from the starting point to the destination determined before actual trajectory generation and does not take into account real-time perception information relating to the environment of the autonomous vehicle. This nominal route may be optimal with respect to a cost/reward function based solely on information in the road network; however, because it is generated with limited information, the nominal route is not necessarily the best or most optimal route between the starting point and destination considering all factors, such as blockages due to double-parked vehicles that are unobservable at time of nominal route generation.

To generate the nominal route, the system may first identify candidate routes that a vehicle can travel on to get from the start position to the destination. The system may then score the candidate routes and identify a nominal route to reach the destination. For example, the system may generate a nominal route that minimizes Euclidean distance traveled or other cost function during the route. Depending on implementation, the system may generate one or more routes using various routing methods, such as Dijkstra's algorithm, Bellman-Ford algorithm, or other algorithms. The routing module 112(b) may also use the traffic information to generate a navigation route that reflects expected conditions of the route (e.g., current day of the week or current time of day, etc.), such that a route generated for travel during rush-hour may differ from a route generated for travel late at night.

For generating the nominal route, the system may receive road network information (e.g., a map) corresponding to a geographical area of the interest from, for example, a map data store. In some embodiments, the road network information may include a road network map of the geographical location. A road network map may be a graphical representation of a collection of interconnected roads included in the geographical area, and may include roads, lanes, and lane segments. A road comprises one or more adjacent lanes, and lanes may be split longitudinally into lane segments.

In some embodiments, the road network information may also include control information, such as direction of travel information, speed limit information, toll information, grade information, such as inclination or angle information, surface material information, aesthetic information, or a combination thereof. In some embodiments, receiving the road network information may include transcoding or reformatting the road network information, storing the reformatted road network information, or both. For example, the road network information may be used to create a graph representation of a road network as a vector map, a curvilinear map, a cartesian map, or the like.

The system may identify the starting point for the nominal route within the geographical area by, for example, identifying a starting point as a current location of the autonomous vehicle. Alternatively and/or additionally, a user may provide the starting point to the system. In certain embodiments, identifying the starting point may include identifying a road, a lane, or other point within the received road network. The system may identify a destination within the geographical area, by for example, receiving user instructions including the destination; based on user information (e.g., if a user travels to the same destination at a certain time, or has a calendar entry for traveling to a destination); or the like. In certain embodiments, identifying the destination may include identifying a road, a lane, or other point within the received road network.

At 304, the system may determine a local region on the nominal route, where the local region may extend a first distance ahead of the autonomous vehicle's current location and a second distance behind the autonomous vehicle's current location.

The trajectory generation step 306 (as executed by the trajectory generation component of the motion planning subsystem) is responsible for continually planning a safe and feasible trajectory for the AV to traverse the local region. In one or more embodiments, the system may generate (306) the trajectory by receiving 342 real-time perception information (e.g., relating to the local region). The real-time information may include, without limitation, perception information corresponding to one or more objects (stationary or moving) in the local region, trajectory predictions relating to one or more objects in the local region, the environment of the autonomous vehicle (e.g., traffic lights, stop signs, intersections, pedestrian cross-walks, map information, etc.) in the local region, current state information of the autonomous vehicle, or the like. Furthermore, trajectory generation 306 may be performed in curvilinear space corresponding to the local region with respect to a reference path. The reference path establishes topological relationships between the autonomous vehicle and the objects in the curvilinear space. In this space, the autonomous vehicle can take discrete actions to be ahead of or behind something, or to the left or right.

Figure 4A:
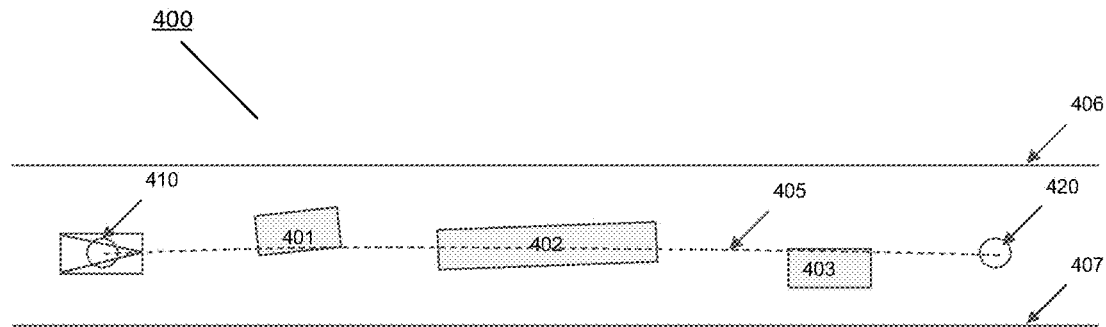
FIG. 4A illustrates a portion of a nominal route while the autonomous vehicle is traveling on the nominal route

The system may perform topologically planning 344 to determine one or more topologically distinct classes in the local region (based on an analysis of the received real-time information). Each topologically distinct class is associated with a set of trajectories that take the same discrete actions with respect to objects in the local region. For example, as shown in FIG. 4A, for traveling a local region 400 between a start position 410 (i.e., the current position of the autonomous vehicle) and a goal position 420 (when the autonomous vehicle will exit the local region), an autonomous vehicle will need to avoid the objects 401, 402, 403. The system may generate the topologically distinct classes by analyzing the spatial relationships the autonomous vehicle can have with the objects 401, 402, 403 with respect to a reference path 405. For the example shown in FIG. 4A, the autonomous vehicle may avoid each of the objects 401, 402, 403 by tracking behind (a longitudinal action), or by passing the object either on the left side or on the right side (a lateral action). The various options are shown as a tree graph 430 in FIG. 4B. Each path 408a-o through the tree graph 430 defines a topologically distinct class of trajectories.

Figure 4B:
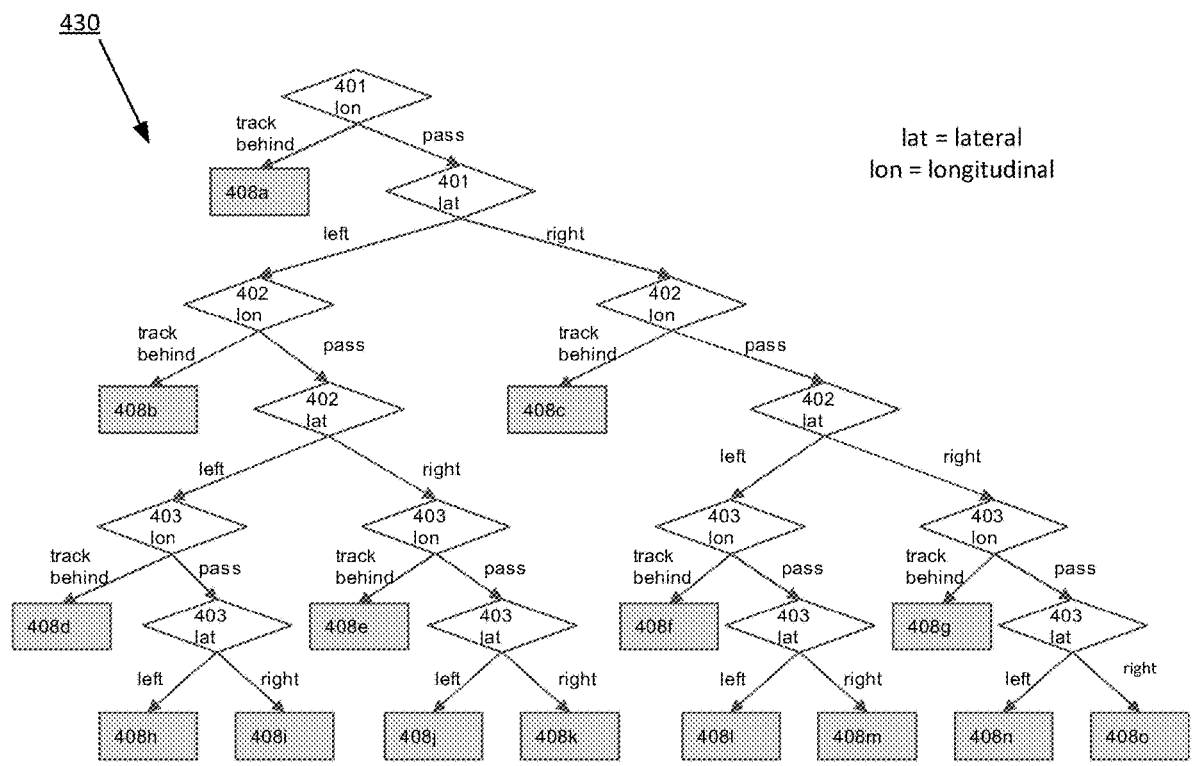
FIGS. 4B-4H illustrate generation of respective convex envelopes and trajectories to traverse the nominal route portion shown in FIG. 4A.
Figure 4C:
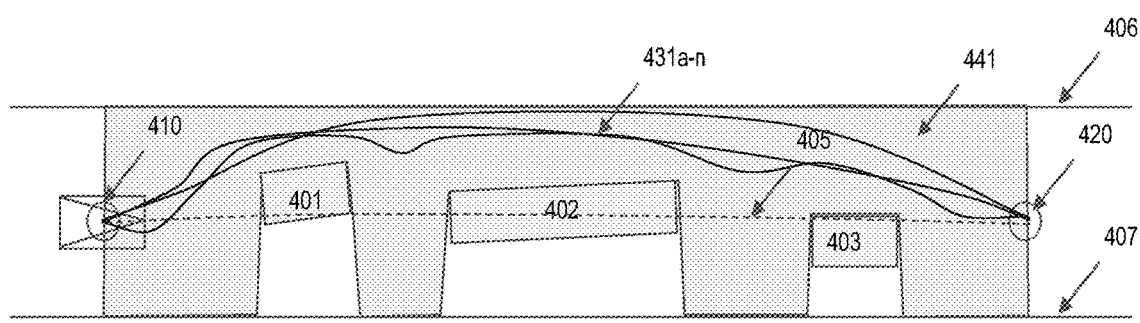
Figure 4D:
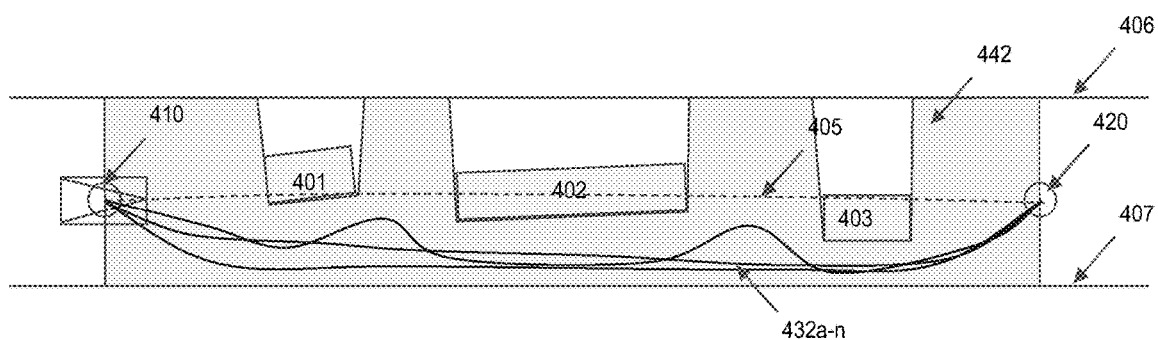
Figure 4E:
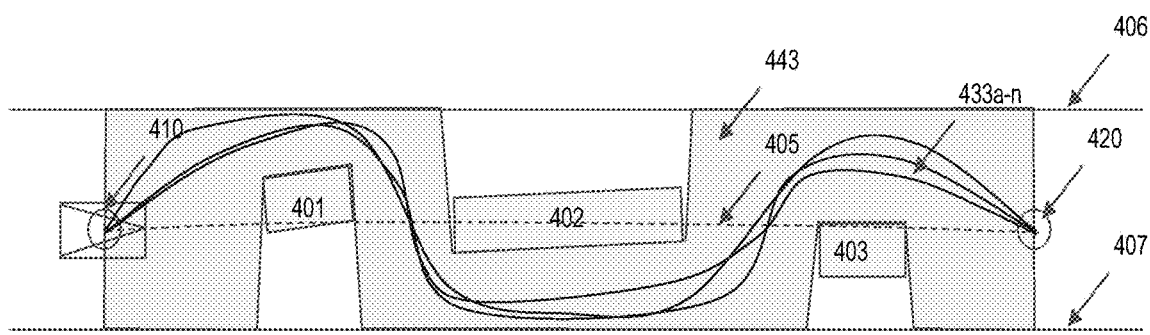
Figure 4F:
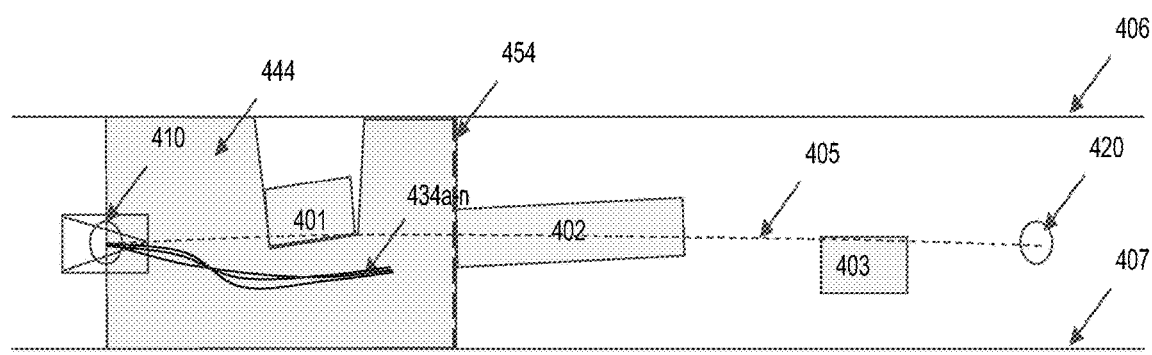
Figure 4G:
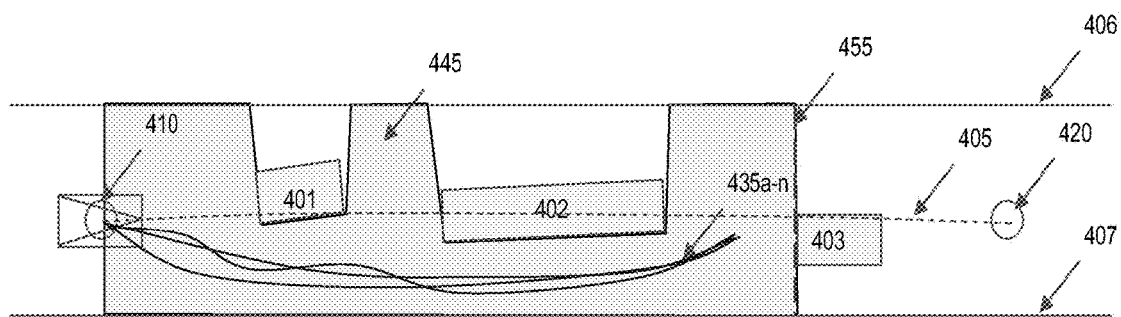

For example, as shown in FIG. 4C a topologically distinct class may include all the trajectories 431a-n that pass each of the objects 401, 402, 403 on the left, which corresponds to node 408h in the tree graph 430 in FIG. 4B. FIG. 4D illustrates a topologically distinct class that includes all the trajectories 432a-n that pass each of the objects 401, 402, 403 on the right, which corresponds to node 408o in the tree graph 430 in FIG. 4B. FIG. 4E illustrates a topologically distinct class that includes all the trajectories 433a-n that pass object 401 on the left, object 402 on the right, and object 403 on the left, which corresponds to node 408j in the tree graph 430 in FIG. 4B. The trajectories 431a-n in FIG. 4C are homotopic, meaning they can be continuously deformed into one another without encroaching on any obstacles. However, the trajectories 431a-n in FIG. 4C are not homotopic with those belonging to other classes, such as the trajectories 432a-n in FIG. 4D. Other topologically distinct classes may be determined for the local region 400 by taking different longitudinal actions. For example, as shown in FIG. 4F a class may include all the trajectories 434a-n that pass object 401 on the right, but track behind object 402, which corresponds to node 408c in the tree graph in FIG. 4B. FIG. 4G illustrates a class that includes all the trajectories 435a-n that pass objects 401 and 402 on the right but track behind object 403, which corresponds to node 408g in the tree graph 430 in FIG. 4B.

The system may then compute a set of constraints 346 (including one or more constraints) for each topologically distinct class of trajectories determined through topological planning 344, where the set of constraints defines a convex envelope (bounded area) in curvilinear space within which the autonomous vehicle trajectory is confined. As discussed above, the autonomous vehicle can take discrete actions with respect to each object (e.g., to be ahead of or behind something, pass to the left or right, or the like). Each discrete action yields one or more constraints in curvilinear space. For example, the system may consider the following actions which yield the following constraints:

1. With respect to restricted areas, such as intersections and crosswalks:
STOP—yields a constraint to stop before entering a restricted area; and
PROCEED—no constraint.

2. Longitudinal actions with respect to each object:
TRACK BEHIND—yields an upper bound constraint on distance between the object and the autonomous vehicle along the reference path with respect to time;
TRACK AHEAD—yields a lower bound constraint on distance between the object and the autonomous vehicle along the reference path with respect to time; and
IGNORE—no constraint on distance along the reference path with respect to time—the autonomous vehicle may pass the object at any time.

3. Lateral actions with respect to each object:
PASS ON LEFT—yields a right bound constraint on lateral offset from the reference path;
PASS ON RIGHT—yields left bound constraint on lateral offset from the reference path; and
IGNORE—no constraint on lateral offset.

The above actions and constraints are provided for example purposes, and other possible actions and/or constraints are within the scope of this disclosure. It should be noted that the constraints take into account the autonomous vehicle current velocity, speed limit in the local region, acceleration limit, deceleration limit, prediction data relating to objects in the autonomous vehicle environment, or the like.

Referring back to FIGS. 4C-4G, different convex envelopes 441, 442, 443, 444, and 445 corresponding to the constraint set for each of the corresponding topologically distinct classes are shown. All possible trajectories for a class are bounded by the corresponding complex envelope generated based on the constraint set for that class. For example, in FIG. 4F, the envelope 444 illustrates the constraints to (1) track behind object 402, and to (2) pass object 401 on the right. The constraints are expressed in curvilinear space with respect to the reference path 405. To track behind object 402 the longitudinal distance along the reference path must not violate an upper bound 454. To pass object 401 on the right, the lateral offset must not violate a left bound over some interval on the reference path.

In certain embodiments, the system may compute the constraint sets 346 concurrently with topological planning 344. The constraint sets may be used in topological planning to discard constraint sets (and the corresponding topological classes) that are infeasible, redundant with other constraint sets, and/or heuristically expensive. This allows for computationally inexpensive analysis even in complex urban environments where considering every combination of actions for every object may be intractable.

Figure 4H:
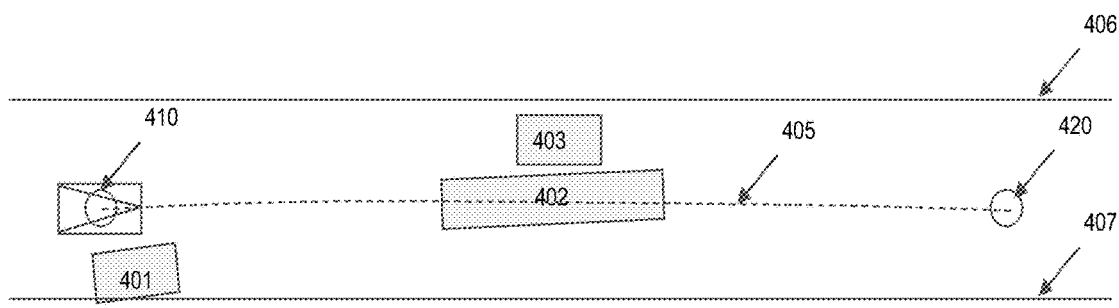

A constraint set may be infeasible based on the incompatibility of the state of the autonomous vehicle and a constraint. For example, as illustrated in FIG. 4H, the autonomous vehicle is on the left side of object 401, and thus passing object 401 on the right side is infeasible. Likewise, it is infeasible to constrain the autonomous vehicle to track behind object 401 because the autonomous vehicle is already alongside it. A constraint set may also be infeasible based on the incompatibility of a pair of constraints. For example, as illustrated in FIG. 4H, object 403 is to the left of object 402, and thus it would be infeasible to constrain the autonomous vehicle to pass object 402 on the right and object 403 on the left. Distinct combinations of actions may also produce redundant constraint sets. For example, in FIG. 4A, a combination of actions to track behind object 401 and track behind 402 yields an identical constraint set with the combination of actions to track behind object 401 and pass object 402 on the left. In such an example, the autonomous vehicle will never reach object 402 so the action selected has no effect and, therefore, topological planning can cease branching after the action is chosen for object 401. This pruning of redundant constraint sets may be exercised to produce the tree graph 430 in FIG. 4B. Heuristic cost may be used to prioritize constraint sets inputs to trajectory optimization when computation time and resources are limited. For example, in FIG. 4H the constraint sets that pass object 403 on the left might be pruned or assigned lower priority because doing so would cause an undesirable violation of the left lane boundary 406.

In certain embodiments, the longitudinal actions and associated constraints may be analyzed before the lateral actions because lateral margins to non-stationary objects are a function of time, and time cannot be estimated until longitudinal constraints are specified. Lateral constraints for stationary objects may be computed irrespective of the longitudinal constraints because they only on the reference path.

At 348, the system may optimize a trajectory for each constraint set to determine a candidate trajectory for each topologically distinct class. This optimization may be performed using model-predictive control or another algorithm, to generate a dynamically feasible and comfortable trajectory that satisfies the constraint set. Computation of the constraint set takes into account real-time information such as, without limitation, perception information about the local region (e.g. traffic signal state) and the predicted trajectories of other objects (e.g. vehicles, pedestrians). In some embodiments, the predicted trajectories may be updated in trajectory optimization to model interaction with the autonomous vehicle. For example, a vehicle in a lane that the autonomous vehicle intends to merge into may decelerate to widen the gap, and the optimized trajectory(ies) may be updated accordingly.

At 350, the system may assign a score to each candidate trajectory, and select (352) a best candidate trajectory based on the assigned scores (e.g., best trajectory selected as maximum reward or minimum cost depending on scoring criteria) to be used for traversing the local region from the optimized trajectories. In certain embodiments, the system may assign a score based on factors such as, without limitation, risk of collision (i.e., a trajectory that has a lesser risk of collision may be assigned a lower cost than a trajectory that has a higher risk of collision), traffic rule violations (i.e. a trajectory that clears an intersection may be assigned lower cost than a trajectory that stops in the intersection and "blocks the box"), passenger comfort (e.g., a trajectory that does not require performing sudden braking or steering maneuvers may be assigned a lower cost than a trajectory that requires such maneuvers), or the like.

The score may be assigned based on for example, the real-time perception information of the autonomous vehicle; location and predicted trajectories of objects in the autonomous vehicle's environment; locations of intersections, lights, stop signs, or the like; location of permissible lane change regions; the nominal route; or the like.

In some embodiments, scoring may be biased for temporal consistency such that the autonomous vehicle may prefer to choose the discrete action it chose the last time it executed the trajectory generation process 306, if still feasible. For example, if the situation changes such that a lane change is no longer feasible, the autonomous vehicle can abort the lane change and transition back to the origin lane, if still feasible. The system may determine (308) whether the autonomous vehicle has reached its destination on the nominal route, and repeat the above local region determination (304) and trajectory generation (306) steps until the vehicle reaches the destination.

The benefits of the described process to trajectory generation 306 using topological planning are as follows. First, the process 306 is more complete compared to sampling-based approaches. Topological planning ensures the system can generate a trajectory for every topologically distinct class, whereas a sampling-based approach may miss some classes if sampling is not sufficiently dense. Second, the process 306 is more efficient than sampling-based approaches, because it ensures just one trajectory is optimized and scored for each topologically distinct class, whereas a sampling-based approach may generate multiple trajectories for some classes, which may be effectively equivalent (i.e. take the same discrete actions with respect to objects). Finally, the process 306 may produce a more optimal trajectory than a sampling-based approach. The process 306 directly optimizes trajectories for constraint sets rather than sampling trajectories without regard for constraints, which may satisfy constraints but sub-optimally. The process is more robust than an optimization only approach because it identifies convex envelopes in which to optimize, whereas an optimization only approach attempts to find a solution in a non-convex constraint space and may converge to a local minima.

The following examples illustrate the use of topological planning for trajectory generation in the context of lane changes and in-lane maneuvers.

Example 1: Lane Changes Using Topological Planning

Figure 5A:
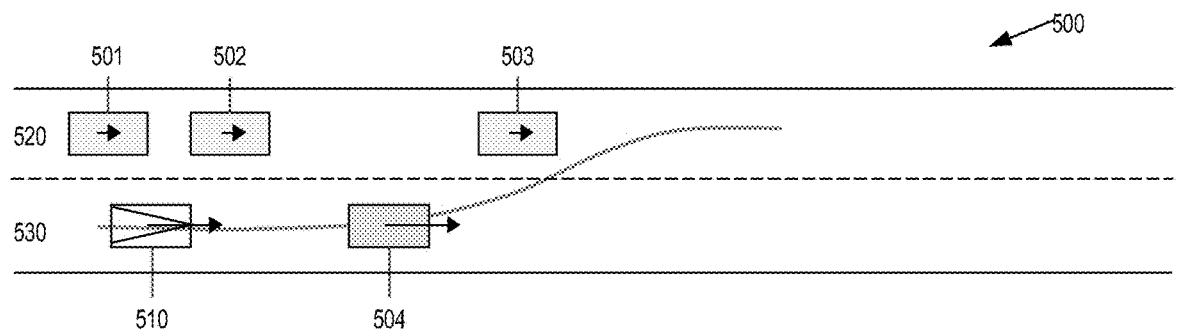
FIGS. 5A-5D illustrate a lane change maneuver in a traffic situation.
Figure 5B:
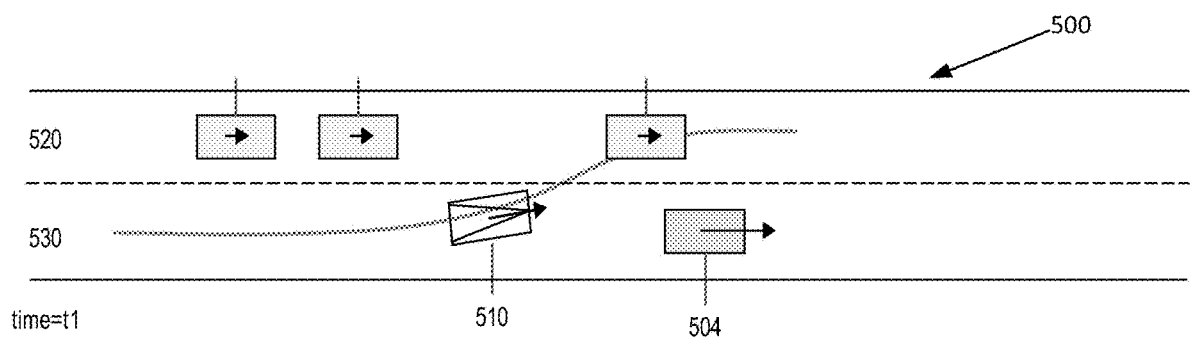
Figure 5C:
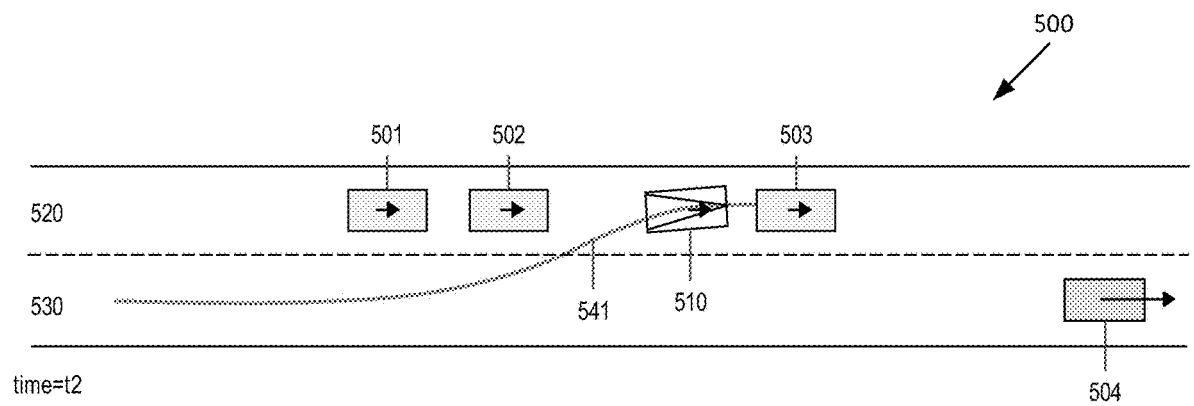

FIGS. 5A-5D illustrate the use of topological planning to perform a lane change maneuver in a dense traffic situation 500. The traffic situation 500 includes 4 moving objects (e.g., moving vehicles) in two lanes—501, 502, and 503 in lane 520, and 504 in lane 530. At time t0 (FIG. 5A), the autonomous vehicle 510 is in lane 530 traveling behind object 504, and needs to execute a lane change into lane 520. At time t0 (FIG. 5A), the autonomous vehicle cannot immediately execute a lane change due to being obstructed by objects 501 and 502. However, if the traffic is faster in lane 530 (i.e., 504 is moving faster than 501, 502, and 503), the autonomous vehicle may plan to accelerate and execute a lane change into the gap between objects 502 and 503. At time t1 (FIG. 5B), the autonomous vehicle is ahead of object 502 and behind object 503 in the destination lane 520, and may initiate the lane change maneuver. The autonomous vehicle also decelerates to track behind object 503. FIG. 5C illustrates completion of the lane change maneuver at time t2, using trajectory 541.

Figure 5D:
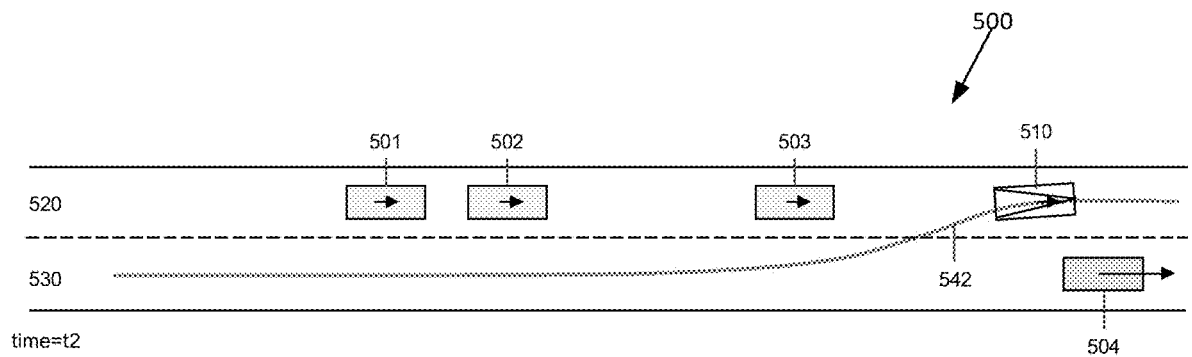

Alternatively, the autonomous vehicle may plan to accelerate and execute a lane change into lane 520 after tracking ahead of object 503. FIG. 5D illustrates such a maneuver including completion of the lane change maneuver at time t2, using trajectory 542.

Whenever an autonomous vehicle is in a lane and/or is transitioning to/from that lane, it is bound by one of the following longitudinal constraints for each object in the lane: track ahead of the object (if behind the autonomous vehicle), track behind the object (if ahead of the autonomous vehicle), or take an action to pass the object on the left or the right. Using these constraints, the system searches for a transition time interval to execute a lane change such that:

Constraints are feasible, i.e. there is no track ahead constraint that would require violation of a track behind constraint.

Constraints are achievable, given the autonomous vehicle's current state and dynamic limits.
  autonomous vehicle must track behind or pass all objects currently ahead of it in origin corridor,
  autonomous vehicle must respect posted speed limits, and
  autonomous vehicle must respect comfort limits on longitudinal acceleration.

Figure 5E:
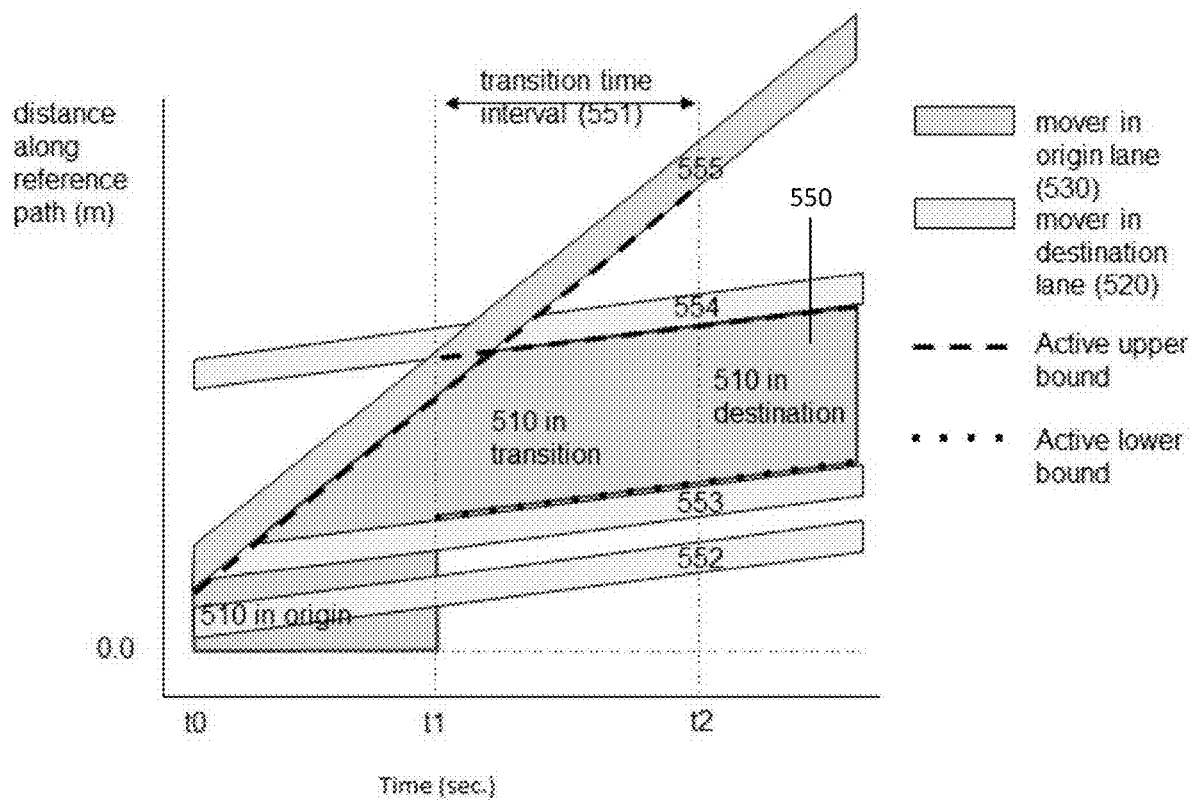
FIGS. 5E-5G illustrate generation of trajectories for the traffic situation of FIG. 5A using respective convex envelopes.

FIG. 5E illustrates an evaluation of a transition time interval 551 by forming a convex envelope 550 that may be used for generating the lane change trajectory 541 shown in FIGS. 5A-5C. In FIG. 5E, 552, 553, and 554 illustrate the longitudinal constraints for objects 501, 502, and 503 in lane 520 (destination lane), and 555 illustrates the longitudinal constraint for object 504 in lane 530 (origin lane), expressed in curvilinear coordinates with respect to reference paths in the lanes 520 and 530. The distances along are with respect to a shared datum (in this case the current autonomous vehicle location). As shown in FIG. 5E, the convex envelope 550 includes trajectories in which the autonomous vehicle tracks behind object 504 from time t0 to t1, tracks behind objects 504 and 503 and ahead of object 502 while transitioning between lanes from time t1 to t2, and finally tracks behind object 503 and ahead of object 502 after t2. After t2 the autonomous vehicle is entirely in lane 520 and has no constraint with respect to 504.

Figure 5F:
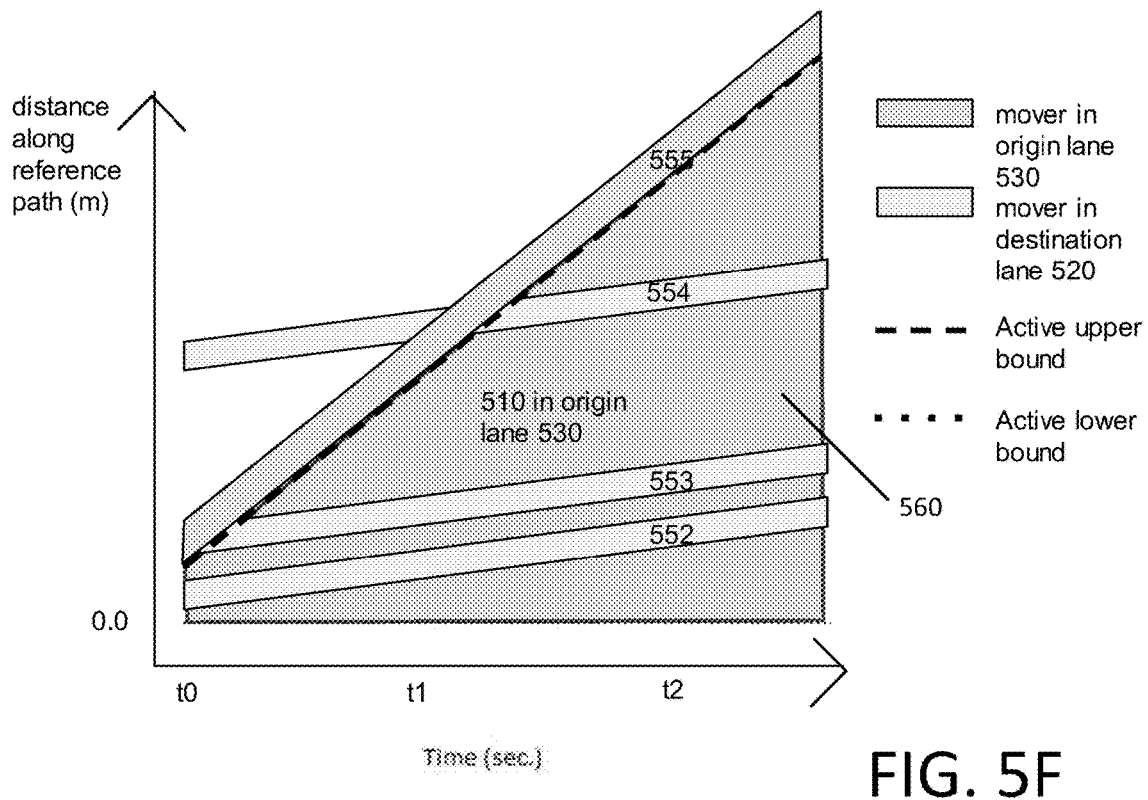

FIG. 5F illustrates a convex envelope 560 that will generate a stay-in lane trajectory for the autonomous vehicle of FIG. 5A. In FIG. 5F, 552-555 illustrate the longitudinal constraints for objects 501-504 just as they do in FIG. 5E. As shown in FIG. 5F, the convex envelope 560 includes trajectories in which the autonomous vehicle stays in lane 530 and tracks behind object 504 at all times.

Figure 5G:
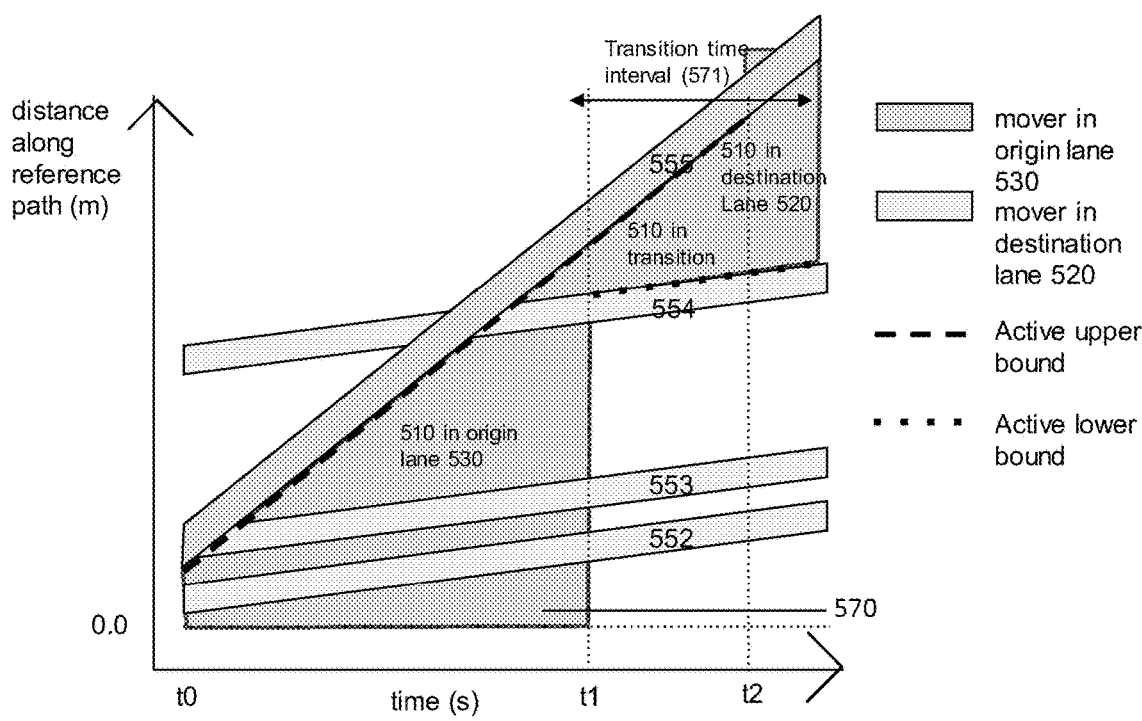

FIG. 5G illustrates an evaluation of an alternative, later transition time interval 571 by forming a convex envelope 570 that may be used for generating the lane change trajectory 542 shown in FIG. 5D. In FIG. 5G, 552-555 illustrate the longitudinal constraints for objects 501-504 just as they do in FIG. 5E. As shown in FIG. 5G, the convex envelope 570 includes trajectories in which the autonomous vehicle tracks behind object 504 from t0 to t1, tracks behind object 504 and ahead of object 503 while transitioning between lanes from time t1 to t2, and finally tracks ahead of object 503 after t2.

The determined convex envelope and transition time interval may be used to determine a transition spline (i.e., trajectory) for executing a lane change that is: within a distance along interval between track ahead/track behind constraints, within a permitted lane change window (as indicated by a map), and is above a minimum length based on the autonomous vehicle's projected speed and lateral acceleration limits.

The above convex envelopes, trajectories, and transition time intervals are provided for example purposes, and are not limiting.

It should be noted that the systems and methods of this disclosure do not relate to making decisions relating to whether a lane change should be performed. Rather, once a lane change decision has been made, the topological planning is used to plan the lane change maneuver.

Example 2: In-Lane Maneuvers

Figure 6A:
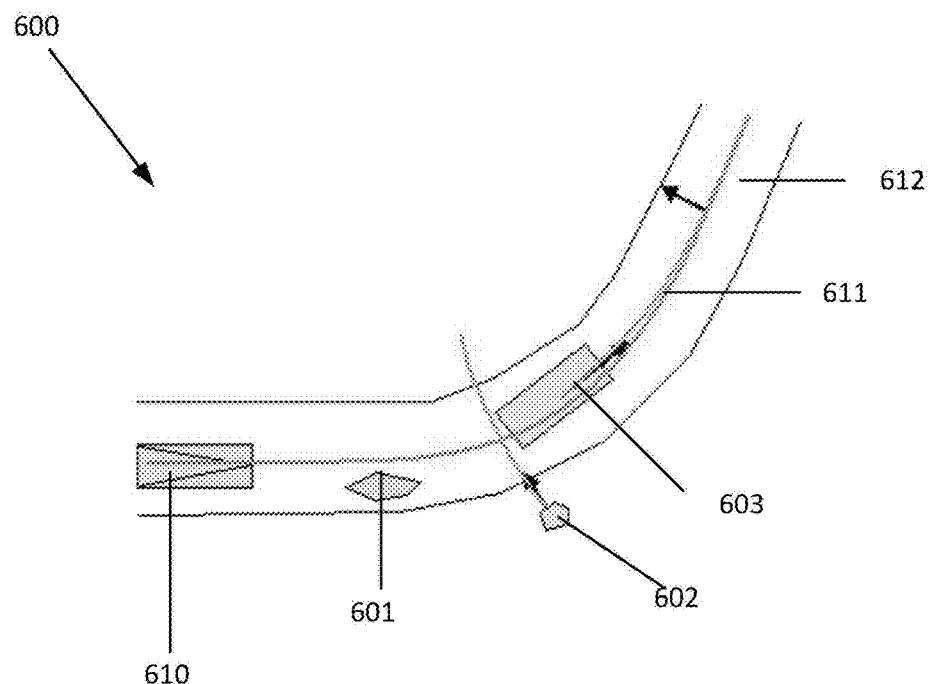
FIG. 6A illustrates example in-lane maneuvers in a traffic situation.

FIG. 6A illustrates example a traffic situation 600 in which an autonomous vehicle 610 makes decisions for in-lane maneuvers using topological planning, while traveling along a reference path 611 in a lane 612. As shown in FIG. 6A, the autonomous vehicle may encounter a static object 601 (e.g., a piece of debris), a laterally moving object 602 (e.g., a jaywalker), and a longitudinally moving object 603 (e.g., another vehicle).

There are at least 3 possible actions that the autonomous vehicle 610 can perform with respect to every object in this traffic situation 600: track behind, pass on left, or pass on right. Additionally, the autonomous vehicle 610 may track ahead of the object 602 (assuming the autonomous vehicle cannot pass the object 603 without performing a lane change, which is not an option being considered in this example). The system may, therefore, produce a total of 36 constraint combinations. However, as discussed above, the system may discard constraint sets that are redundant, infeasible, or heuristically expensive. For example, all constraint sets that include the action corresponding to autonomous vehicle stopping behind the static object 601 are going to result in the same trajectory, and hence only one such constraint set needs to be considered and the others may be discarded as redundant. Some additional constraint sets may be discarded as heuristically expensive. For example, given the action to track behind the jaywalking pedestrian 602 from time t1 to t2 (i.e. wait for the pedestrian to cross the lane before passing), the option to then pass the pedestrian on the left may be discarded as heuristically expensive, because by t2 the pedestrian will be on the left side of the lane, and passing on the left would force the AV to leave the lane. Similarly, given the action to track ahead of the pedestrian 602 from time t1 to t2 (i.e. pass before the pedestrian crosses the lane), the option to pass the pedestrian on the right may be discarded as heuristically expensive, because at t1 the pedestrian would still be on the right side of the lane and passing on the right would force the autonomous vehicle to leave the lane. When infeasible, redundant, and heuristically expensive constraint sets are discarded, only 5 remain:
  Stop for static object 601,
  Pass static object 601 on the left and object 602 on right (wait), then track behind object 603,
  Pass static object 601 on the right and object 602 on right (wait), then track behind object 603,
  Pass static object 601 on left and object 602 on left (don't wait), then track behind object 603, and
  Pass static object 601 on right and object 602 on left (don't wait), then track behind object 603

Therefore, the system may generate optimized trajectories for each of the above constraint sets and select the best trajectory by scoring them based on the current environment of the autonomous vehicle. In some embodiments, the system may also discard the third and the fifth constraint sets above if, for example, lateral margins indicate that passing the static obstacle on the right requires lane mark violation, drivable area violation, or the like. These candidate trajectories would be low priority for optimization and scoring in anytime planning.

Figure 6B:
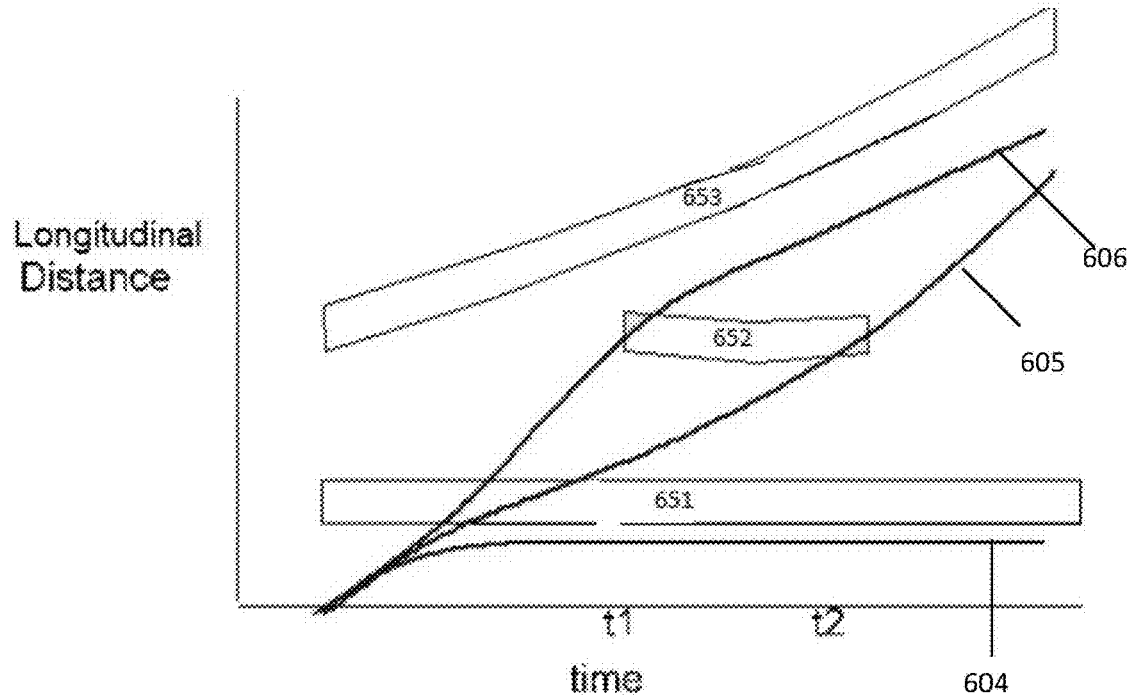
FIG. 6B illustrates example longitudinal constraints corresponding to the traffic situation of FIG. 6A.

FIG. 6B illustrates longitudinal constraints 651, 652, and 653 for each of the objects 601, 602, and 603, respectively, by representing longitudinal distance along reference path 611 with respect to time. Such constraints have a start and end time of validity, when the object is sufficiently near the reference path (or in the lane). The times of validity span the entire horizon for objects 601 and 603, but only an interval for the object 602. The lines 604, 605, and 606 illustrate candidate trajectories taking into account only the longitudinal constraints: stop before the object 601 (604); or pass the static object and track ahead of (605) or behind (606) the object 602.

Figure 6C:
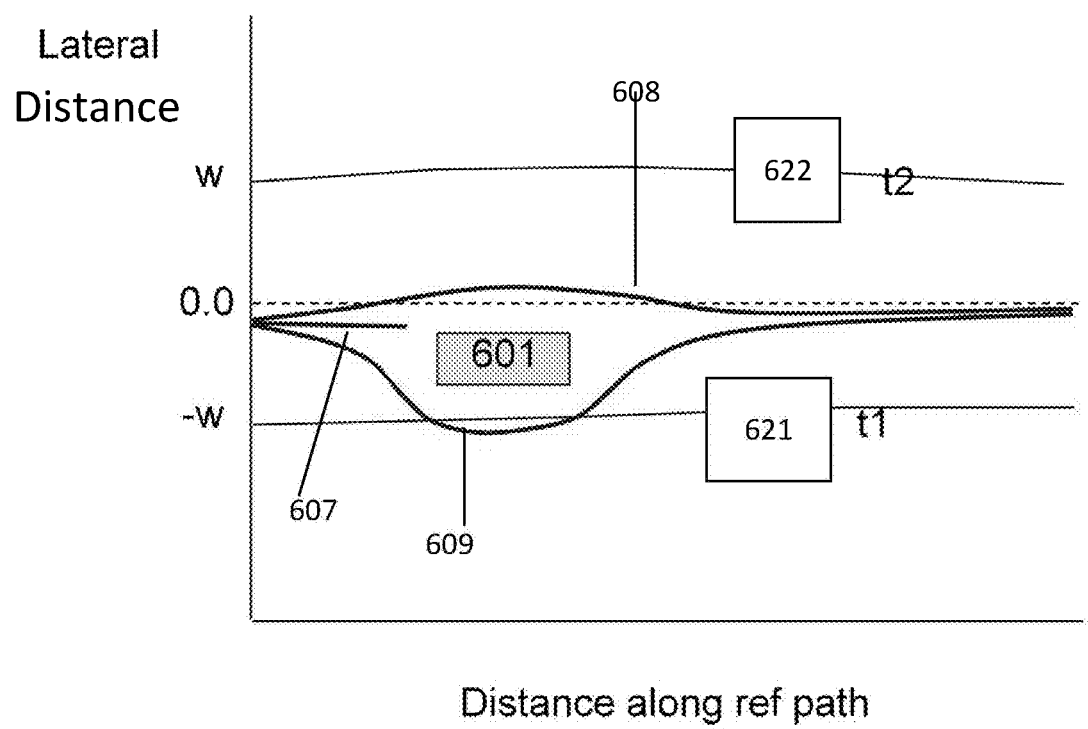
FIG. 6C illustrates example lateral constraints corresponding to the traffic situation of FIG. 6A.

FIG. 6C illustrates lateral constraints for each of the objects 601, 602, and 603 as lateral distance with respect to distance along the reference path 611. The lines 607, 608 and 609 illustrate candidate trajectories taking into account only the lateral constraints: stop before the static object 601 (607); pass the static object 601 on the left (608) or on the right (609). The autonomous vehicle need not veer to pass the object 602. However, the lateral distance to the object 602 is a function of time (and hence must be considered based on the corresponding longitudinal constraints)—621 is before the object 602 crosses the lane 612 (at time t1) and 622 is after the object 602 crosses the lane 612 (at time t2).

Figure 7:
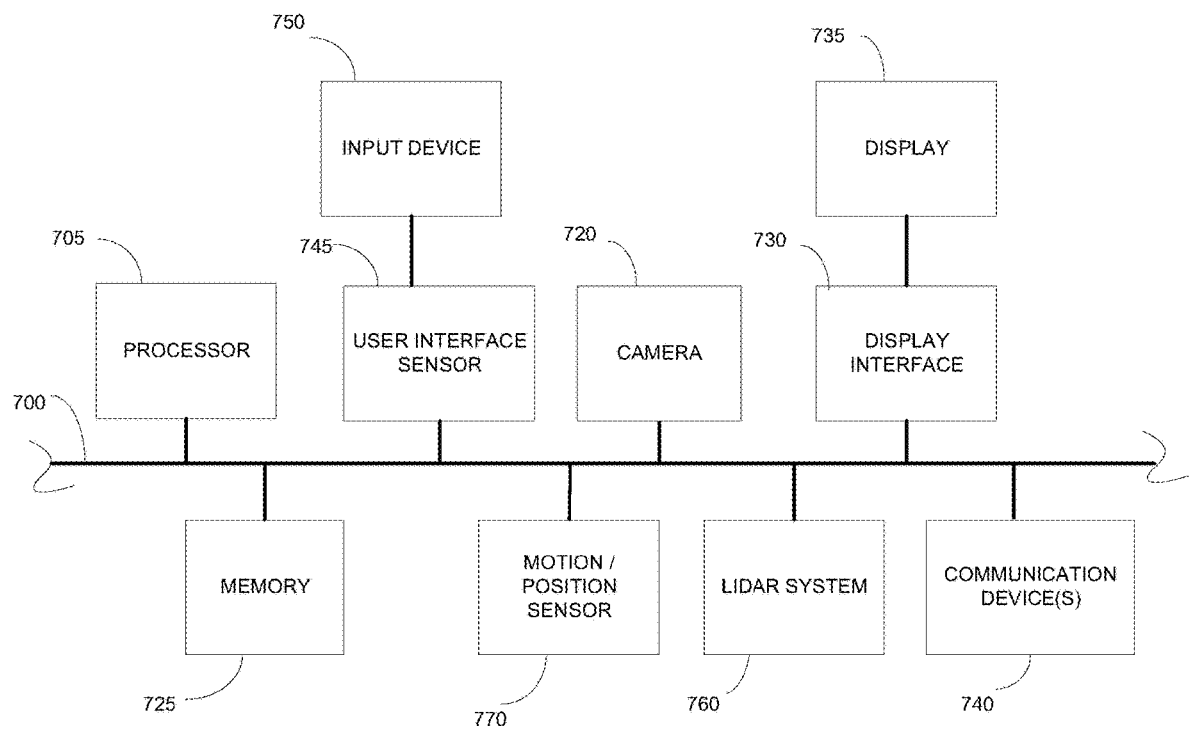
FIG. 7 is a block diagram of elements of a computing device on which the various systems and methods in this document could be implemented.

FIG. 7 depicts an example of internal hardware that may be included in any of the electronic components of the system, such as the controller (or components of the controller) of the autonomous vehicle, the control system, servers etc. described above. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, an RFID tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

It should be noted that while the training of the neural network model and using the trained model in this disclosure is described with respect to autonomous vehicles and objects in the environments of the autonomous vehicles, the disclosure is not so limiting. The rolling horizon training methods described above may be used for training neural networks for use in other scenarios that are constrained by inertial parameters that represent short-term dynamics of an object. Examples may include neural network models configured for making predictions relating to movement of players and/or objects such as balls in a sports environment; or any other system or environment that is both constrained by physics and involves behavioral choice.

Terminology that is relevant to the disclosure provided above includes;

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" or AV is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft).

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The invention claimed is:

1. A method of maneuvering an autonomous vehicle while traversing a route to a destination location, the method comprising:
    determining, for an autonomous vehicle while traversing a route to a destination location, a local region that surrounds the autonomous vehicle;
    receiving real-time information corresponding to the local region;
    performing topological planning to identify one or more topologically distinct classes of trajectories, wherein each of the one or more topologically distinct classes is associated with a plurality of trajectories that take the same combination of discrete actions with respect to objects in the local region;
    computing a constraint set for each of the one or more topologically distinct classes of trajectories, the constraint set for a topologically distinct class defining a bounded area in curvilinear space that confines the plurality of trajectories associated with that topologically distinct class;
    for each constraint set, generating a candidate trajectory; and
    selecting, from amongst one or more candidate trajectories, a trajectory for the autonomous vehicle to traverse the local region by:
        assigning a score to each of the one or more candidate trajectories, and
        selecting a candidate trajectory that has a best score as the trajectory for the autonomous vehicle to traverse the local region.

2. The method of claim 1, wherein the real-time information comprises at least one of the following: perception information corresponding to the one or more objects in the local region, trajectory predictions relating to the one or more objects in the local region, information relating to an environment of the autonomous vehicle in the local region, or current state information of the autonomous vehicle.

3. A system comprising:
    an autonomous vehicle comprising one or more sensors;
    a processor; and
    a non-transitory computer readable medium comprising one or more programming instructions that when executed by the processor, will cause the processor to:
        determine, for the autonomous vehicle while traversing a route to a destination location, a local region that surrounds the autonomous vehicle;
        receive real-time information corresponding to the local region;
        perform topological planning to identify one or more topologically distinct classes of trajectories, wherein each of the one or more topologically distinct classes is associated with a plurality of trajectories that take the same combination of discrete actions with respect to objects in the local region;
        compute a constraint set for each of the one or more topologically distinct classes of trajectories, the constraint set for a topologically distinct class defining a bounded area in curvilinear space that confines the plurality of trajectories associated with that topologically distinct class;
        for each constraint set, generate a candidate trajectory; and
        select, from amongst one or more candidate trajectories, a trajectory for the autonomous vehicle to traverse the local region
            assigning a score to each of the one or more candidate trajectories, and
            selecting a candidate trajectory that has a best score as the trajectory for the autonomous vehicle to traverse the local region.

4. The method of claim 1, wherein assigning the score to each of the one or more candidate trajectories further comprises assigning a score based on at least one of the following: a risk of collision associated with that trajectory, or compliance of that trajectory with traffic rules, or a comfort level associated with that trajectory.

5. The method of claim 1, wherein assigning the score to each of the one or more candidate trajectories comprises biasing the score in favor of temporal consistency of the selected trajectory between successive trajectory selection cycles.

6. The method of claim 1, further comprising discarding a constraint set of the one or more constraint sets corresponding to the one or more topologically distinct classes of trajectories upon determining that the constraint set is at least one of the following: infeasible, redundant, or heuristically expensive.

7. The method of claim 1, wherein each constraint set comprises one or more constraints associated with at least one of the following: longitudinal autonomous vehicle actions associated with perceived static or dynamic objects in the local region; longitudinal autonomous vehicle actions associated with restricted map areas; lateral autonomous vehicle actions associated with perceived static or dynamic objects in the local region; or lateral autonomous vehicle actions associated with restricted map areas.

8. The method of claim 1, wherein computing the constraint set comprises, with respect to a moving object, determining one or more constraints associated with longitudinal autonomous vehicle actions before determining one or more constraints associated with lateral autonomous vehicle actions.

9. The method of claim 1, further comprising updating the determined candidate trajectory based on at least one of the following: real-time information corresponding to the local region; or predictions updated based on an intent of the autonomous vehicle.

10. The method of claim 1, wherein the trajectory for the autonomous vehicle to traverse the local region comprises a lane change trajectory, and the method further comprises identifying a time interval for executing the lane change.

11. The method of claim 1, wherein the local region is a region around the autonomous vehicle that includes a first area in front of a current location of the autonomous vehicle and a second area behind the current location of the autonomous vehicle.

12. The system of claim 3, wherein assigning the score to each of the one or more candidate trajectories comprises biasing the score in favor of temporal consistency of the selected trajectory between successive trajectory selection cycles.

13. The system of claim 3, wherein the real-time information comprises at least one of the following: perception information corresponding to the one or more objects in the local region, trajectory predictions relating to the one or more objects in the local region, information relating to an environment of the autonomous vehicle in the local region, or current state information of the autonomous vehicle.

14. The system of claim 3, wherein the local region is a region around the autonomous vehicle that includes a first area in front of a current location of the autonomous vehicle and a second area behind the current location of the autonomous vehicle.

15. The system of claim 3, wherein the one or more programming instructions that when executed by the processor, will cause the processor to assign the score to each of the one or more candidate trajectories further comprise programing instructions to cause the processor to assign a score based on at least one of the following: a risk of collision associated with that trajectory, or compliance of that trajectory with traffic rules, or a comfort level associated with that trajectory.

16. The system of claim 3, wherein the trajectory for the autonomous vehicle to traverse the local region comprises a lane change trajectory, and the system further comprises programming instructions to cause the processor to identify a time interval for executing the lane change.

17. The system of claim 3, further comprising programming instructions that when executed by the processor, will cause the processor to discard a constraint set of the one or more constraint sets corresponding to the one or more topologically distinct classes of trajectories upon determining that the constraint set is at least one of the following: infeasible, redundant, or heuristically expensive.

18. The system of claim 3, wherein each constraint set comprises one or more constraints associated with at least one of the following: longitudinal autonomous vehicle actions associated with perceived static or dynamic objects in the local region; longitudinal autonomous vehicle actions associated with restricted map areas; lateral autonomous vehicle actions associated with perceived static or dynamic objects in the local region; or lateral autonomous vehicle actions associated with restricted map areas.

19. The system of claim 3, wherein the one or more programming instructions that when executed by the processor, will cause the processor to compute the constraint set further comprise programming instructions to determine, with respect to a moving object, one or more constraints associated with longitudinal autonomous vehicle actions before determining one or more constraints associated with lateral autonomous vehicle actions.

20. The system of claim 3, further comprising programming instructions that when executed by the processor, will cause the processor to update the determined candidate trajectory based on at least one of the following: real-time information corresponding to the local region; or predictions updated based on an intent of the autonomous vehicle.

* * * * *